(12) United States Patent
Toyama et al.

(10) Patent No.: US 7,697,095 B2
(45) Date of Patent: Apr. 13, 2010

(54) LIQUID CRYSTAL DISPLAY DEVICE

(75) Inventors: Hirofumi Toyama, Minami-ashigara (JP); Hajime Nakayama, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 126 days.

(21) Appl. No.: 11/930,255

(22) Filed: Oct. 31, 2007

(65) Prior Publication Data
US 2008/0137014 A1 Jun. 12, 2008

(30) Foreign Application Priority Data
Nov. 1, 2006 (JP) ............... 2006-297353

(51) Int. Cl.
*G02F 1/13363* (2006.01)
(52) U.S. Cl. ............... 349/119; 349/117
(58) Field of Classification Search ............... None
See application file for complete search history.

(56) References Cited

U.S. PATENT DOCUMENTS 6,638,582 B1 * 10/2003 Uchiyama et al. ............ 428/1.2

2001/0026338 A1 * 10/2001 Aminaka ............... 349/117
2006/0132686 A1 * 6/2006 Jeon et al. ............... 349/117

FOREIGN PATENT DOCUMENTS

JP  2003-344856  12/2003

* cited by examiner

*Primary Examiner*—Omar Rojas
(74) *Attorney, Agent, or Firm*—Buchanan Ingersoll & Rooney PC

(57) ABSTRACT

A novel liquid crystal display device is disclosed. The device comprises a first polarizing element and a second polarizing element which are disposed with their transmission axes perpendicular to each other, a liquid crystal layer disposed between the first and the second polarizing elements, and a first optically anisotropic layer disposed between the first or the second polarizing element and the liquid crystal layer, showing a positive in-plane retardation (Re) at λ1 and a negative Re at λ2, both of λ1 and λ2 (λ1≠λ2) are within a visible wavelength range, and its absolute value of a thickness-direction retardation at 550 nm, |Rth(550)|, is equal to or more than 50 nm.

9 Claims, 10 Drawing Sheets

PRIOR ART

PRIOR ART

PRIOR ART

PRIOR ART

LIQUID CRYSTAL DISPLAY DEVICE

CROSS-REFERENCE TO RELATED APPLICATIONS

This application claims benefit of priority under 35 U.S.C. 119 to Japanese Patent Application No. 2006-297353, filed Nov. 1, 2006, and the entire content of the application is incorporated herein by reference.

BACKGROUND OF THE INVENTION

1. Field of the Invention

The present invention relates to a liquid crystal display device having excellent viewing angle characteristics.

2. Related Art

Liquid crystal display devices are widely used in various applications of personal computer and mobile monitors and televisions, as having various advantages that they may be driven at low voltage and are power-saving and they may be small-sized and their bodies may be thinned. Various modes have been proposed for such liquid crystal display devices, depending on the alignment state of the liquid crystal molecules in the liquid crystal cell therein. Heretofore, a TN mode has been the mainstream for the devices, in which the crystal molecules are aligned as twisted by about 90° from the lower substrate toward the upper substrate of the liquid crystal cell.

In general, a liquid crystal display device comprises a liquid crystal cell, an optically-compensatory sheet and a polarizing element. The optically-compensatory sheet is for canceling image coloration and for enlarging viewing angle, for which used are a stretched birefringent film and a transparent film coated with liquid crystal. For example, Patent Reference 1 discloses a technique of applying an optically-compensatory sheet, which is prepared by applying a discotic liquid crystal onto a triacetyl cellulose film followed by aligning and fixing it, to a TN-mode liquid crystal cell thereby enlarging the viewing angle of the device. However, in liquid crystal display devices for application to televisions that are expected to watch at various angles on a large-size screen, the requirement for viewing angle dependency is serious; and even by the above-mentioned method, the serious requirement for them could not still be satisfied. Accordingly, liquid crystal display devices of other modes than the TN mode, such as an IPS (in-plane switching) mode, an OCB (optically-compensatory bent) mode or a VA (vertically-aligned) mode have been studied. In particular, a VA mode is specifically noted for liquid crystal display devices for TVs, as its contrast is high and its producibility is relatively high.

However, the VA mode enables a nearly completely black display in the normal line direction of panel, but has a problem in that, when the panel is observed in the oblique direction thereof, then it causes light leakage and the viewing angle is thereby narrowed. To solve the problem, proposed is use of an optically-biaxial retardation plate of which the refractive index differs all in the three-dimensional direction of the film, thereby to improve the viewing angle characteristics of the VA-mode device (for example, Japanese Laid-Open Patent Publication No. 2003-344856).

However, the light leakage is reduced only within a specific wavelength range (for example, green light at about 550 nm), and nothing is taken into consideration for the light leakage in any other wavelength range (for example, blue light at about 450 nm, red light at about 650 nm). Accordingly, for example, when the panel is observed obliquely in a black state, then the problem of color shift in blue or red coloration is not as yet solved.

SUMMARY OF THE INVENTION

One object of the invention is to provide a liquid crystal display device capable of displaying an image at a high contrast ratio with a broad viewing angle range and reduced in a color shift (color change when observed obliquely).

In one aspect, the invention provides a liquid crystal display device comprising:

a first polarizing element and a second polarizing element which are disposed with their transmission axes perpendicular to each other, a liquid crystal layer disposed between the first and the second polarizing elements, and a first optically anisotropic layer disposed between the first or the second polarizing element and the liquid crystal layer, showing a positive in-plane retardation (Re) at $\lambda 1$ and a negative Re at $\lambda 2$, both of $\lambda 1$ and $\lambda 2$ ($\lambda 1 \neq \lambda 2$) are within a visible wavelength range, and its absolute value of a thickness-direction retardation at 550 nm, $|Rth(550)|$, is equal to or more than 50 nm.

As embodiments of the invention, the liquid crystal display device wherein the first optically anisotropic layer satisfies following relations (1) and (2):

$$Re(450) \times Re(650) < 0 \tag{1}$$

$$|Rth(550)/Re(550)| > 10 \tag{2}$$

wherein $Re(\lambda)$ means an in-plane retardation (unit; nm) measured applying light having a wavelength of $\lambda$ nm to the layer, and the positivity and the negativity of Re is decided with reference to an absorption axis of the first and second polarizing element which is disposed nearer to the layer than another, and the direction parallel to the absorption direction is a positive direction;

the liquid crystal display device of claim 1, comprising a second optically anisotropic layer disposed between the first or the second polarizing element and the liquid crystal layer, wherein the second optically anisotropic layer satisfies relations (3) and (4):

$$30 \text{ nm} < Re(550) < 400 \text{ nm} \tag{3}$$

$$100 \text{ nm} < Rth(550) < 300 \text{ nm} \tag{4}$$

wherein $Re(\lambda)$ means an in-plane retardation (unit; nm) measured by applying a light having a wavelength of $\lambda$ nm to the layer; $Rth(\lambda)$ means a thickness-direction retardation (unit; nm) measured by applying a light having a wavelength of $\lambda$ nm to the layer; and the liquid crystal display device, wherein the first optically anisotropic layer is disposed between the liquid crystal cell and the first polarizing element, and the second optically anisotropic layer is disposed between the liquid crystal cell and the second polarizing element; are provided.

The liquid crystal display device of the invention may employ a vertically aligned mode. As the VA-mode embodiments, the liquid crystal display device, wherein the first optically anisotropic layer satisfies all of following relations:

$Re(450)>0$, $Re(650)<0$, $Rth(550)>0$, and $|Rth(450)|/|Rth(650)| \geq 1.0$;

the liquid crystal display device, wherein the first optically anisotropic layer satisfies all of following relations:

$Re(450)>0$, $Re(650)<0$, $Rth(550)>0$, and $|Rth(450)|/|Rth(650)|<1.0$;

the liquid crystal display device, wherein the first optically anisotropic layer satisfies all of following relations:

$Re(450)<0$, $Re(650)>0$, $Rth(550)>0$, and $|Rth(450)|/|Rth(650)|\leq 1.0$; and the liquid crystal display device, wherein the first optically anisotropic layer satisfies all of following relations:

$Re(450)<0$, $Re(650)>0$, $Rth(550)>0$, and $|Rth(450)|/|Rth(650)|\geq 1.0$; are provided.

The liquid crystal display device of the invention may employ an in-plane switching mode. As the IPS-mode embodiments, the liquid crystal display device, wherein the first optically anisotropic layer satisfies all of following relations:

$Re(450)<0$, $Re(650)>0$, $Rth(550)<0$, and $|Rth(450)|/|Rth(650)|\geq 1.0$;

the liquid crystal display device, wherein the first optically anisotropic layer satisfies all of following relations:

$Re(450)<0$, $Re(650)>0$, $Rth(550)<0$, and $|Rth(450)|/|Rth(650)|<1.0$;

the liquid crystal display device, wherein the first optically anisotropic layer satisfies all of following relations:

$Re(450)>0$, $Re(650)<0$, $Rth(550)<0$, and $|Rth(450)|/|Rth(650)|<1.0$; and the liquid crystal display device, wherein the first optically anisotropic layer satisfies all of following relations:

$Re(450)>0$, $Re(650)<0$, $Rth(550)<0$, and $|Rth(450)|/|Rth(650)|\geq 1.0$; are provided.

The first optically anisotropic layer may be selected from cellulose acylate films.

The first optically anisotropic layer may comprise at least one Rth enhancer.

Figure 1:
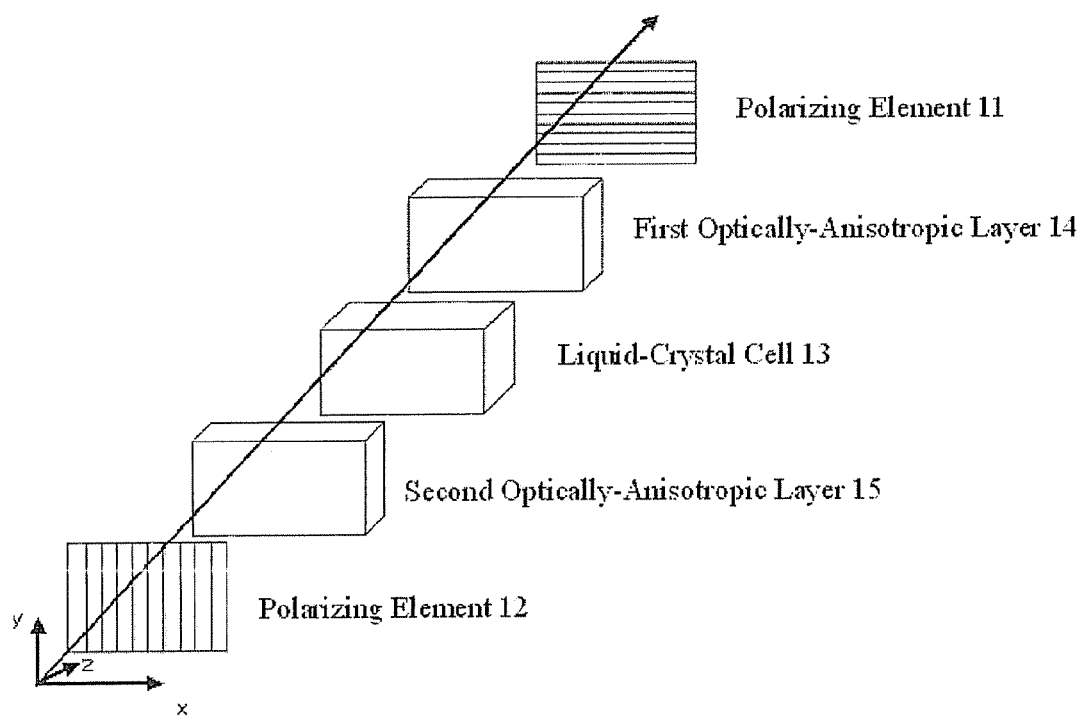
FIG. 1 is a schematic outline view of one example of the liquid crystal display device of the invention.

In the drawings, the reference numerals have the following meanings:

11, 21, 51 Polarizing Element
12, 22, 52 Polarizing Element
13, 23, 53 Liquid crystal Cell
14, 24 First Optically anisotropic Layer
15, 25 Second Optically anisotropic Layer
54 Optically-Compensatory Film (C-plate)
55 Optically-Compensatory Film (A-plate)

DETAILED DESCRIPTION OF THE INVENTION

The invention is described hereinunder. In this description, the numerical range expressed by the wording "a number to another number" means the range that falls between the former number indicating the lowermost limit of the range and the latter number indicating the uppermost limit thereof. In the description, regarding angles, the allowable error is about ±10°. The term "perpendicular" or "parallel" may also be interpreted as a meaning including the allowable error.

In this description, $Re(\lambda)$ and $Rth(\lambda)$ are an in-plane retardation (nm) and a thickness-direction retardation (nm), respectively, at a wavelength of $\lambda$. $Re(\lambda)$ is measured by applying light having a wavelength of $\lambda$ nm to a film in the normal direction of the film, using KOBRA 21ADH or WR (by Oji Scientific Instruments). $Rth(\lambda)$ is calculated by KOBRA 21ADH or WR based on six $Re(\lambda)$ values which are measured for incoming light of a wavelength $\lambda$ nm in six directions which are decided by a 10° step rotation from 0° to 50° with respect to the normal direction of a sample film using an in-plane slow axis, which is decided by KOBRA 21ADH, as an a tilt axis (a rotation axis; defined in an arbitrary in-plane direction if the film has no slow axis in plane); a value of hypothetical mean refractive index; and a value entered as a thickness value of the film.

In the above, when the film to be analyzed has a direction in which the retardation value is zero at a certain tilt angle, around the in-plane slow axis from the normal direction as the rotation axis, then the retardation value at the tilt angle larger than the tilt angle to give a zero retardation is changed to negative data, and then the Rth($\lambda$) of the film is calculated by KOBRA 21ADH or WR.

Around the slow axis as the tilt angle (rotation angle) of the film (when the film does not have a slow axis, then its rotation axis may be in any in-plane direction of the film), the retardation values are measured in any desired inclined two directions, and based on the data, and the estimated value of the mean refractive index and the inputted film thickness value, Rth may be calculated according to the following formulae (21) and (22):

$$Re(\theta) = \left[ nx - \frac{ny \times nz}{\sqrt{\{ny\sin(\sin^{-1}(\frac{\sin(-\theta)}{nx}))\}^2 + \{nz\cos(\sin^{-1}(\frac{\sin(-\theta)}{nx}))\}^2}} \right] \times \frac{d}{\cos\{\sin^{-1}(\frac{\sin(-\theta)}{nx})\}} \quad (21)$$

$$Rth = \{(nx+ny)/2 - nz\} \times d \quad (22)$$

wherein Re($\theta$) represents a retardation value in the direction inclined by an angle $\theta$ from the normal direction; nx represents a refractive index in the in-plane slow axis direction; ny represents a refractive index in the in-plane direction perpendicular to nx; and nz represents a refractive index in the direction perpendicular to nx and ny. And "d" is a thickness of the sample.

When the film to be analyzed is not expressed by a monoaxial or biaxial index ellipsoid, or that is, when the film does not have an optical axis, then Rth($\lambda$) of the film may be calculated as follows:

Re($\lambda$) of the film is measured around the slow axis (judged by KOBRA 21ADH or WR) as the in-plane tilt axis (rotation axis), relative to the normal direction of the film from −50 degrees up to +50 degrees at intervals of 10 degrees, in 11 points in all with a light having a wavelength of $\lambda$ nm applied in the inclined direction; and based on the thus-measured retardation values, the estimated value of the mean refractive index and the inputted film thickness value, Rth($\lambda$) of the film may be calculated by KOBRA 21ADH or WR. Based on thus-calculated nx, ny and nz, Nz=(nx−nz)/(nx−ny) is further calculated.

In the description, Re(450), Re(550), Re(650), Rth(450), Rth(550) and Rth(650) are measured as follows:

Using a measuring instrument, a sample is analyzed at three or more different wavelengths (for example, $\lambda$=479.2, 546.3, 632.8, 745.3 nm), and Re and Rth of the sample are calculated at those wavelengths. The data are approximated according to a Cauchy's formula (up to the trinominal expression, Re=A+B/$\lambda^2$+C/$\lambda^4$), to obtain the values A, B and C. From the above, Re and Rth at a wavelength $\lambda$ are plotted, and Re and Rth at wavelengths of 450, 550 and 650 nm are obtained as Re(450), Re(550), Re(650), Rth(450), Rth(550) and Rth(650).

The present invention relates to a liquid crystal display device comprising a first polarizing element and a second polarizing element which are disposed with their transmission axes perpendicular to each other, a liquid crystal layer disposed between the first and the second polarizing elements, and a first optically anisotropic layer disposed between the first or the second polarizing element and the liquid crystal layer, showing a positive in-plane retardation (Re) at $\lambda$1 and a negative Re at $\lambda$2, both of $\lambda$1 and $\lambda$2 ($\lambda$1≠$\lambda$2) are within a visible wavelength range, and its absolute value of a thickness-direction retardation at 550 nm, |Rth(550)|, is equal to or more than 50 nm. One embodiment of the present invention comprising the first optically anisotropic layer satisfying the following relations (1) and (2) and a second optically anisotropic layer having at least one optical axis.

$$Re(450) \times Re(650) < 0 \quad (1)$$

$$Rth(550)/Re(550) > 10 \quad (2).$$

In the relations, Re($\lambda$) means the in-plane retardation (unit; nm) measured by applying a light having a wavelength of $\lambda$ nm to the layer. The positivity and the negativity of Re of the first optically anisotropic layer is decided with reference to the basis of the absorption axis of the polarizing element disposed on the same side, and the direction parallel to the absorption axis is positive.

The optically anisotropic layer may contribute to improving displaying characteristics of various LCDs independently or in combination with another optically anisotropic layer. The first optically anisotropic layer may be employed with an optically anisotropic layer having at least one optical axis.

The effect of the invention is described below with reference to the drawings.

One embodiment of the liquid crystal display device of the invention is shown in FIG. 1. The invention may be effective for liquid crystal display devices of any liquid crystal modes, not depending on the driving system of the devices. As one example of the invention, FIG. 1 shows one embodiment of the constitution of a VA-mode liquid crystal display device. The liquid crystal display device of FIG. 1 comprises a liquid crystal cell 13, and a pair of polarizing element 11 and polarizing element 12 disposed on both sides of the liquid crystal cell 13 as sandwiched therebetween. Between the polarizing element 11 and the liquid crystal cell 13, the device has an optically anisotropic layer 14 that satisfies the above relations (1) and (2); and between the polarizing element 12 and the liquid crystal cell 13, it has an optically anisotropic layer 15 having at least one optical axis. The polarizing elements 11 and 12 are disposed that their transmission axes are parallel to each other. Preferably, the second optically anisotropic layer 15 is so disposed that the in-plane slow axis thereof is perpendicular to the absorption axis of the polarizing element 12.

Any of the polarizing elements 11 and 12 may be on the backlight side or the display panel side of the device. The first optically anisotropic layer 14 and the second optically anisotropic layer 15 may be disposed as protective films for the polarizing elements 11 and 12, as kept in contact with the surface of each element. Between the polarizing element 11 and the first optically anisotropic layer 14, and between the polarizing element 12 and the second optically anisotropic layer 15, other protective films for them may be separately disposed; and the protective films are preferably isotropic films having a retardation of nearly zero (0).

Figure 7:
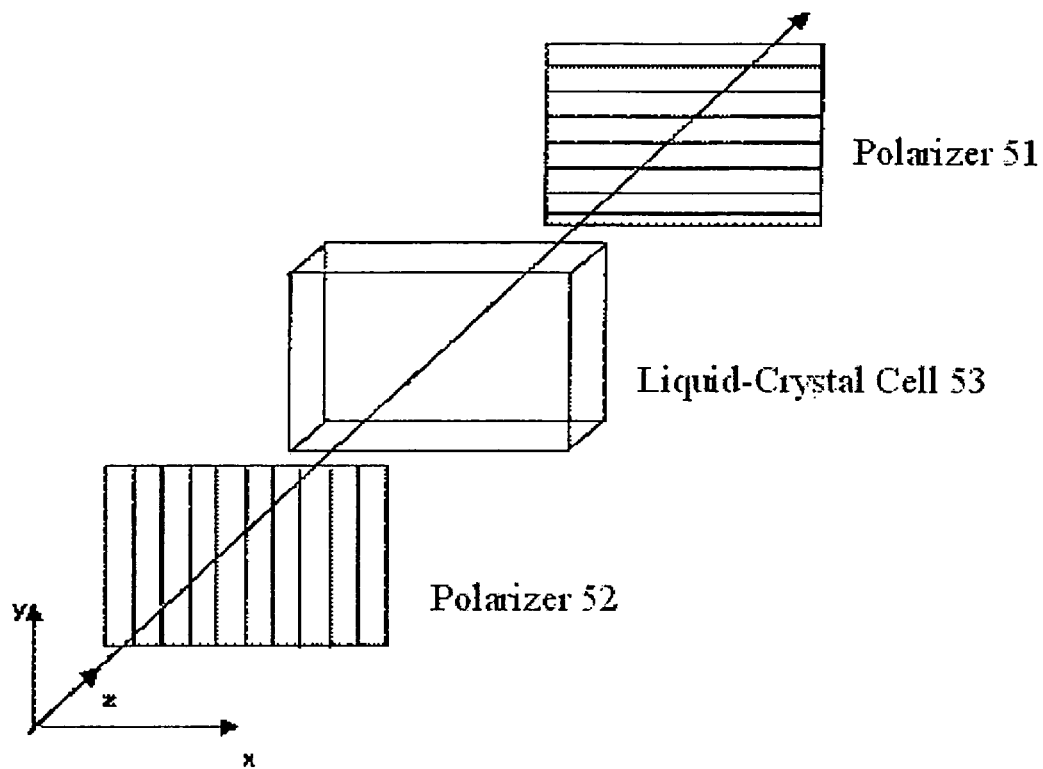
FIG. 7 is a schematic outline view of one example of an ordinary VA-mode liquid crystal display device.

The effect of the invention is described with reference to the drawings. For comparison, FIG. 7 is given as a schematic view showing the constitution of an ordinary VA-mode liquid crystal display device. The VA-mode liquid crystal display device generally comprises a liquid crystal cell 53 that has a liquid crystal layer in which the liquid crystal is vertically aligned relative to the substrate face in no voltage application thereto, or that is, in the black state, and polarizers 51 and 52 that are so disposed as to sandwich the liquid crystal cell 53 therebetween and that their transmission axes (shown by stripes in FIG. 7) are perpendicular to each other. In FIG. 7, light comes into the device from the side of the polarizer 52. When light comes into the device in the normal direction, or that is, in the z-axis direction in no voltage application to the device, then the light having passed through the polarizer 52 further passes through the liquid crystal 53 cell while keeping its linear polarization state, and then completely blocked by the polarizer 51. As a result, the device displays a high-contrast image.

Figure 8:
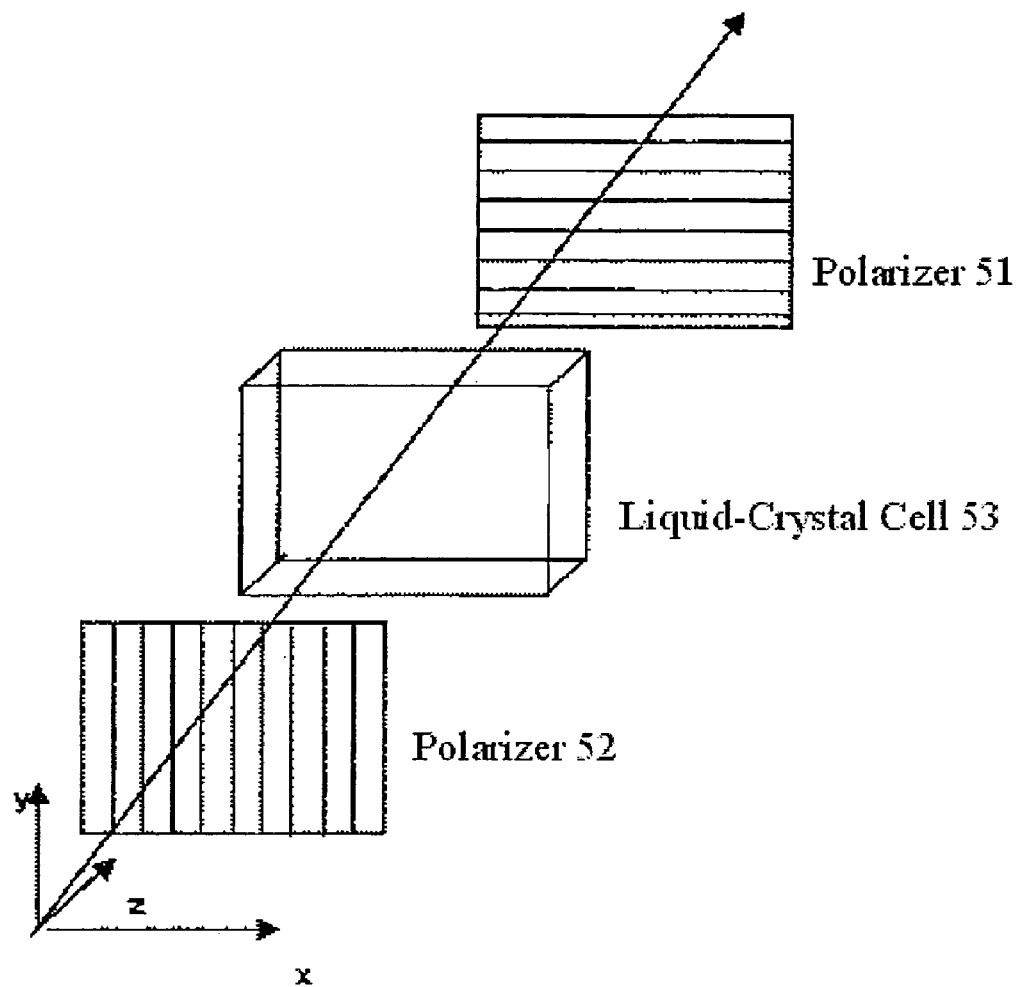
FIG. 8 is a schematic outline view of one example of an ordinary VA-mode liquid crystal display device.

However, the condition differs in oblique light application as in FIG. 8. When light comes in the device not in the z-axis direction but in an oblique direction, or that is, when the incident light to the device is in the oblique direction relative to the polarization direction of the polarizers 51 and 52 (so-called off-axis), then the incident light is influenced by the oblique-direction retardation while passing through the vertically-aligned liquid crystal layer of the liquid crystal cell 53, whereby its polarization state changes. Further, the apparent transmission axes of the polarizer 51 and the polarizer 52 shift from the perpendicularly-crossing disposition. Because of these two factors, the incident light in the oblique direction in the off-axis condition could not be completely blocked by the polarizer 51, and as a result, there may occur light leakage in the black state, thereby causing contrast reduction.

A polar angle and an azimuth angle are defined herein. The polar angle is an angle as inclined in the normal direction of a film face, or that is, from the z-axis in FIG. 7 and FIG. 8, and, for example, the normal direction of the film face is a direction at a polar angle of 0 degree. The azimuth angle indicates a direction as rotated in the counterclockwise direction based on the positive direction of the x-axis, and for example, the positive direction of the x-axis is a direction at an azimuth angle of 0 degree. The positive direction of the y-axis is a direction of an azimuth angle of 90 degrees. The above-mentioned oblique direction in off-axis condition mainly indicates a case where the polar angle is not 0 degree and the azimuth angle is 45 degrees, 135 degrees, 225 degrees or 315 degrees.

Heretofore, it is proposed to solve the problem of contrast reduction in the oblique direction in a VA-mode liquid crystal display device, by the use of a biaxial plate and a C-plate (for example, Japanese Laid-Open Patent Publication No. 2003-344856). Heretofore, various stretched polymer films are used in optically-compensatory films; but in general, most stretched polymer films satisfy a relation of Re(450)≧Re(550)≧Re(650) and Rth(450)≧Rth(550)≧Rth(650), or that is, they have larger Re or Rth values at shorter visible wavelengths (hereinafter this characteristic is occasionally referred to as "regular wavelength dispersion characteristic of Re or Rth" respectively; and the reversed characteristic, or in other words the characteristic having larger Re and Rth values at longer visible wavelengths, is occasionally referred to as "reversed wavelength dispersion characteristic of Re or Rth" respectively).

Figure 9:
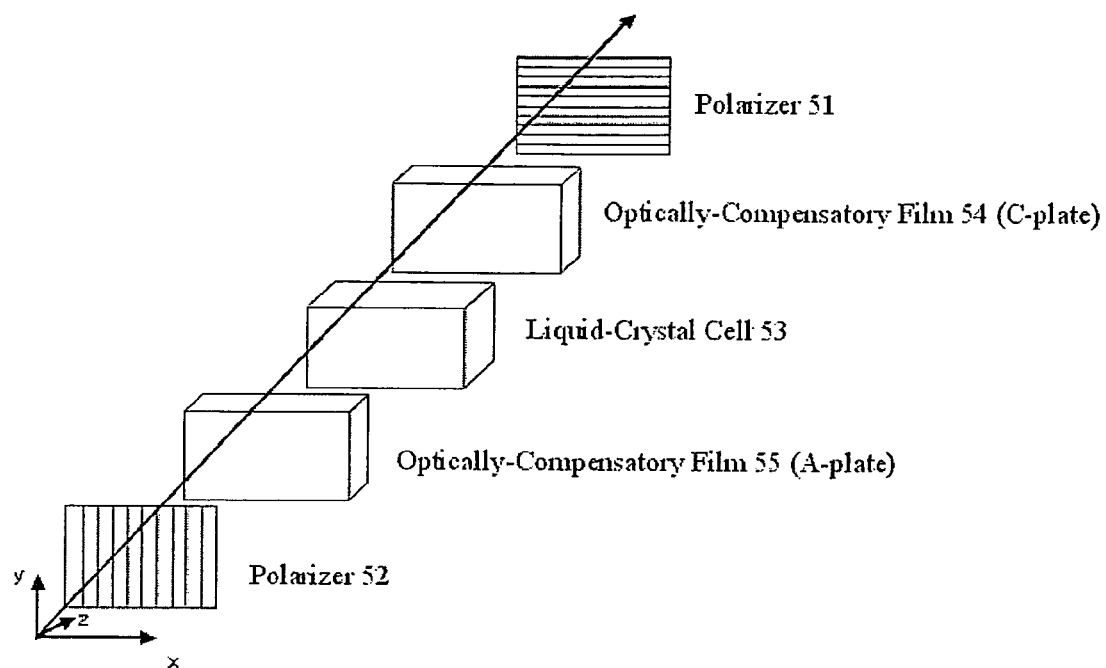
FIG. 9 is a schematic outline view of one example of a conventional VA-mode liquid crystal display device.
Figure 10:
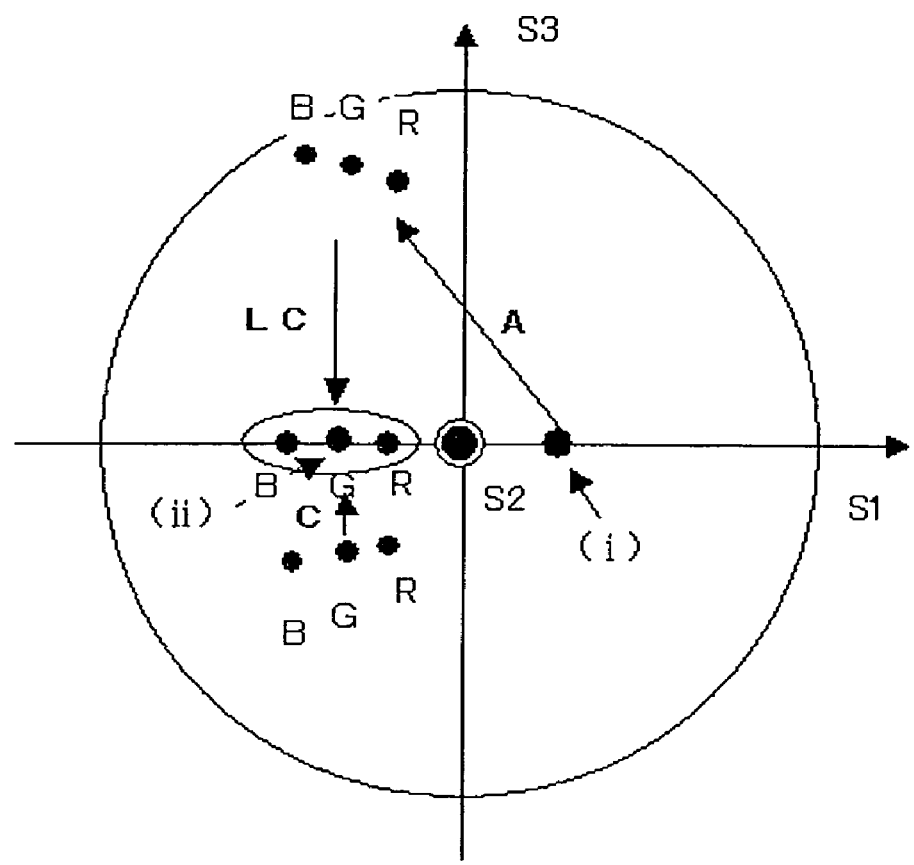
FIG. 10 is a view used for explaining one example of the optical compensatory mechanism of a conventional VA-mode liquid crystal display device on a Poincare sphere.

FIG. 9 shows a schematic view of one example of a conventional VA-mode liquid crystal display device comprising a biaxial plate and a C-plate. The liquid crystal display device of FIG. 9 comprises a liquid crystal cell 53 and a pair of a polarizer 51 and a polarizer 52, and has an optically-compensatory film 55 of A-plate between the polarizer 52 and the liquid crystal cell 53, and an optically-compensatory film 54 of C-plate between the polarizer 51 and the liquid crystal cell 53. FIG. 10 is a view showing the compensatory mechanism of the constitution of FIG. 9, using a Poincare sphere. The Poincare sphere is a three-dimensional map to describe a polarization state, and the equator of the sphere indicates linear polarization. In this, the light propagation direction in the liquid crystal display device is at an azimuth direction of 45 degrees and a polar direction of 34 degrees. In FIG. 10, the S2 axis is an axis running through the paper vertically from the back to the top; and FIG. 10 shows a view to see a Poincare sphere from the positive direction of the S2 axis. In this, S1, S2 and S3 coordinates indicate values of stoke parameters in a certain polarization state. FIG. 10 shows the two-dimensional condition, in which, therefore, the displacement at the point before and after the change of the polarization state is shown by the linear arrow in the drawing. In fact, however, the polarization state change of light having passed through a liquid crystal layer and an optically-compensatory film is represented by rotation at a specific angle around a specific axis determined in accordance with the individual optical characteristics, on a Poincare sphere.

The polarization state of the incident light having passed through the polarizer 52 in FIG. 9 corresponds to the point (i) in FIG. 10; and the polarization state of the light as blocked by the absorption axis of the polarizer 51 in FIG. 9 corresponds to the point (ii) in FIG. 10. Heretofore, in a VA-mode liquid crystal display device, the off-axis light leakage in an oblique direction is caused by the shift of the polarization state of the out-going light at the point (ii). An optically-anisotropy film is generally used for changing the polarization state of the incident light correctly from the point (i) to the point (ii), including the polarization state change in the liquid crystal layer.

The polarization state change of the incident light having passed through the optically-compensatory film 55 of A-plate follows the trace shown by the arrow "A" in FIG. 10. The rotation angle on a Poincare sphere is proportional to a value $\Delta n'd'/\lambda$ that is obtained by dividing an effective retardation from the oblique direction on which the liquid crystal display device is watched, $\Delta n'd'$ by the wavelength of light, $\lambda$. As described in the above, when an ordinary stretched polymer film is used as the optically-compensatory film 55, then Re is larger at a shorter wavelength, and the effective retardation Re of R (red), G (green) and B (blue) differs from each other, and the reciprocal of the wavelength $\lambda$ is larger at a shorter wavelength, and accordingly, the rotation angles at different wavelengths of R, G and B are in an order of B>G>R. As the polarization states of R, G and B after rotation, the (S1, S2, S3) coordinates, are as shown in FIG. 10.

The liquid crystal layer of the liquid crystal cell 53 shows positive refractive anisotropy, and is vertically aligned, and therefore, the polarization state change of the incident light having passed through the liquid crystal layer follows the trace as indicated by the arrow with "LC" running from the top to the bottom in FIG. 10 and is represented by the rotation around the SI axis, on a Poincare sphere.

The polarization state change of B, G and R lights running through the optically-compensatory film 54 of C-plate is represented by the movement in the normal direction on the S1-S2 plane, as indicated by the arrow with "C" in FIG. 10, on a Poincare sphere. As shown in FIG. 10, all the R light, G light and B light of which the S1 coordinates are not the same and which are in different polarization states in this movement could not be converted into the polarization state at the point (ii). Since the light shifted at different wavelengths could not be blocked by the polarizer, therefore causing light leakage. The coloration of light is ascribable to the addition of R, G and B lights, and therefore, when light at a specific wavelength leaks out, then the addition ratio of R, G and B may change, therefore causing color change. This may be observed as "color shift" when a liquid crystal display device is observed in an oblique direction.

In this description, the wavelengths of R, G and B are as follows: R is at a wavelength of 650 nm; G is at a wavelength of 550 nm; and B is a wavelength at 450 nm. R, G and B are not always represented typically by these wavelengths, but they may be suitable wavelengths for specifically defining the optical characteristics of the liquid crystal display device that exhibits the effect of the invention.

The first optically anisotropic layer in the liquid crystal display device of the invention satisfies the following relations (1) and (2), and therefore, the device enables the conversion of the polarization state to the position of the point (ii) for all the R light, G light and B light.

$$Re(450) \times Re(650) < 0 \quad (1)$$

$$Rth(550)/Re(550) > 10 \quad (2).$$

Figure 2:
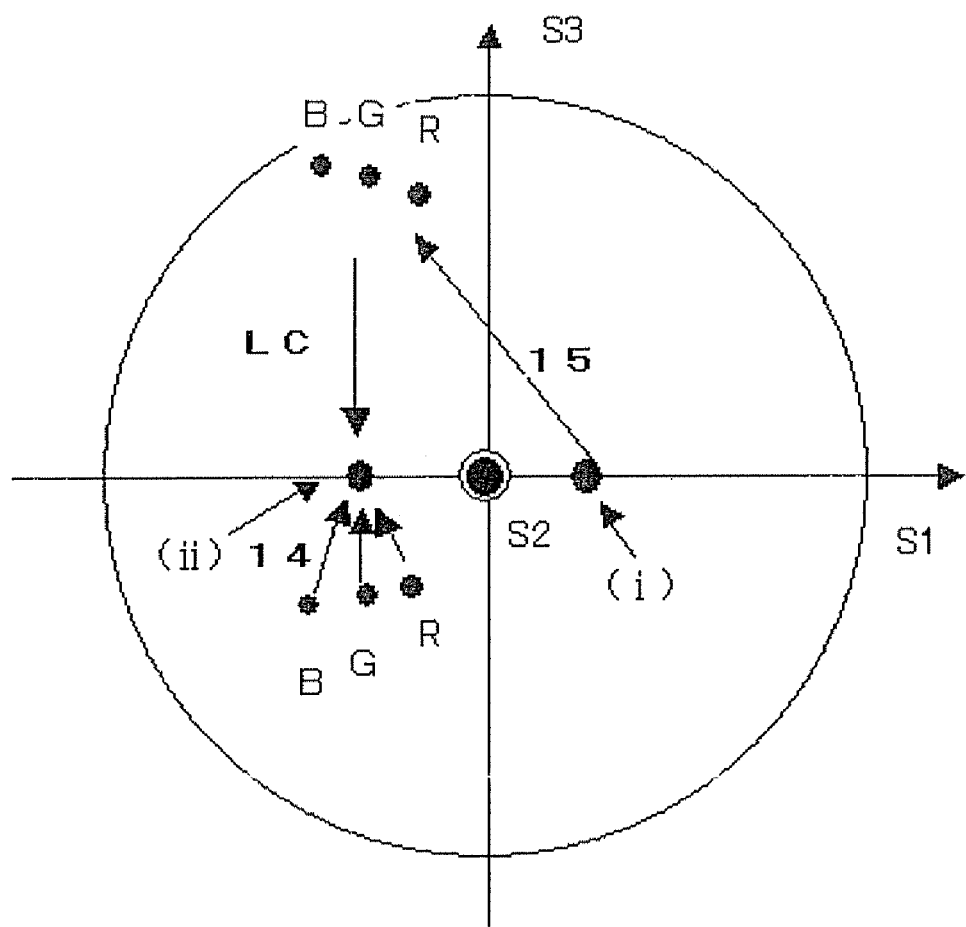
FIG. 2 is a view used for explaining one example of the optical compensatory mechanism of the liquid crystal display device of the invention on a Poincare sphere.

Using the Poincare sphere shown in FIG. 2, one example of the compensatory mechanism of the liquid crystal display device of the invention having a constitution of FIG. 1 is described. The light running into the device in the oblique direction passes through the polarizing element 12 to be a linear polarized light of the polarization state at the point (i) in FIG. 2. Next, when this passes through the second optionally-anisotropic layer 15, then its polarization state is changed by the optical characteristics of the second optically anisotropic layer. The polarization state change is represented by the rotation by the angle proportional to the value $\Delta n'd'/\lambda$, that is an effective retardation from the oblique direction, $\Delta n'd'$, divided by the wavelength of light $\lambda$, based on a predetermined axis as the rotation axis, determined by the optical characteristics of the second optically anisotropic layer, as indicated by the arrow with "15" in FIG. 2, on a Poincare sphere. As described in the above, in general, the effective retardation changes depending on the wavelength and the reciprocal of the wavelength $\lambda$ also changes depending on the wavelength; and therefore, the polarization states of R, G and B after rotation, or that is, the (S1, S2, S3) coordinates differ, as shown in FIG. 2.

The liquid crystal layer of the liquid crystal cell 13 shows positive refractive anisotropy, and is vertically aligned, and therefore, the polarization state change of the incident light having passed through the liquid crystal layer follows the trace as indicated by the arrow with "LC" running from the top to the bottom in FIG. 2 and is represented by the rotation around the SI axis.

Figure 3:
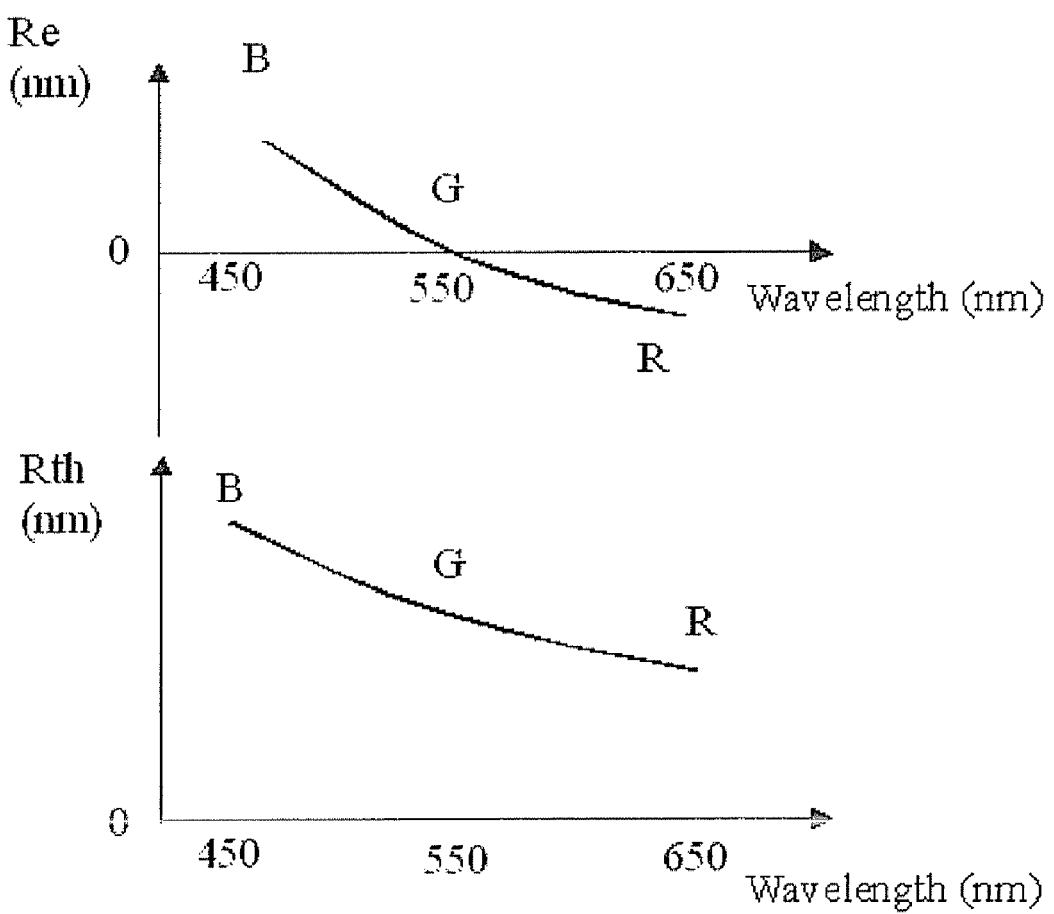
FIG. 3 is a graph schematically showing the optical characteristics of one example of the first optically anisotropic layer usable in the liquid crystal display device of the invention.

Next, the incident light passes through the first optically anisotropic layer 14. Since the first optically anisotropic layer 14 satisfies the above expression (2), the polarization stage change of the incident light follows the trace similar to the rotation around the S1 axis, as shown in FIG. 2. Further, since the first optically anisotropic layer 14 satisfies the above expression (1), the light of R, G and B at different wavelengths, after having passed through the first optically-compensatory layer 14, are optically compensated with the different slow axis for the different wavelength at different retardation. More concretely, the wavelength R (650) is at the lower light of the point (ii), and for moving it toward the point (ii), it must be brought up toward the upper left. For enabling the movement of this mode, Re(650) of the first optically anisotropic layer 14 may be negative and Rth(650) thereof may be positive. Similarly, the wavelength G (550) is below the point (ii), and for moving it toward the point (ii), Re(550) of the first optically anisotropic layer 14 may be zero and Rth(550) thereof may be positive. Further, the wavelength B (450) is on the lower left of the point (ii), and for moving it toward the point (ii), it must be brought up toward the upper right. For enabling the movement of this mode, Re(450) of the first optically anisotropic layer 14 may be positive and Rth (450) thereof may be also positive. In other words, using the first optically anisotropic layer 14 having the optical characteristics schematically shown in the graph of FIG. 3 makes it possible to change all the light R, light G and light B to the polarization state at the point (ii), thereby reducing the color change in watching the device in the oblique direction (this corresponds to the constitution of group A of different groups mentioned below).

The optically compensatory mechanism shown in FIG. 2 is one example. The first optically anisotropic layer in the invention may satisfy the relations (1) and (2), and the wavelength dependency of Re and Rth of the first optically anisotropic layer is not specifically defined. Regarding the Re or Rth, the first optically anisotropic layer may have a regular or reversed wavelength dispersion characteristics or a constant value for any visible light wavelengths; and the wavelength dependencies of Re and Rth may be determined in accordance with the wavelength dependency of Re and/or Rth of the second optically anisotropic layer.

Figure 4:
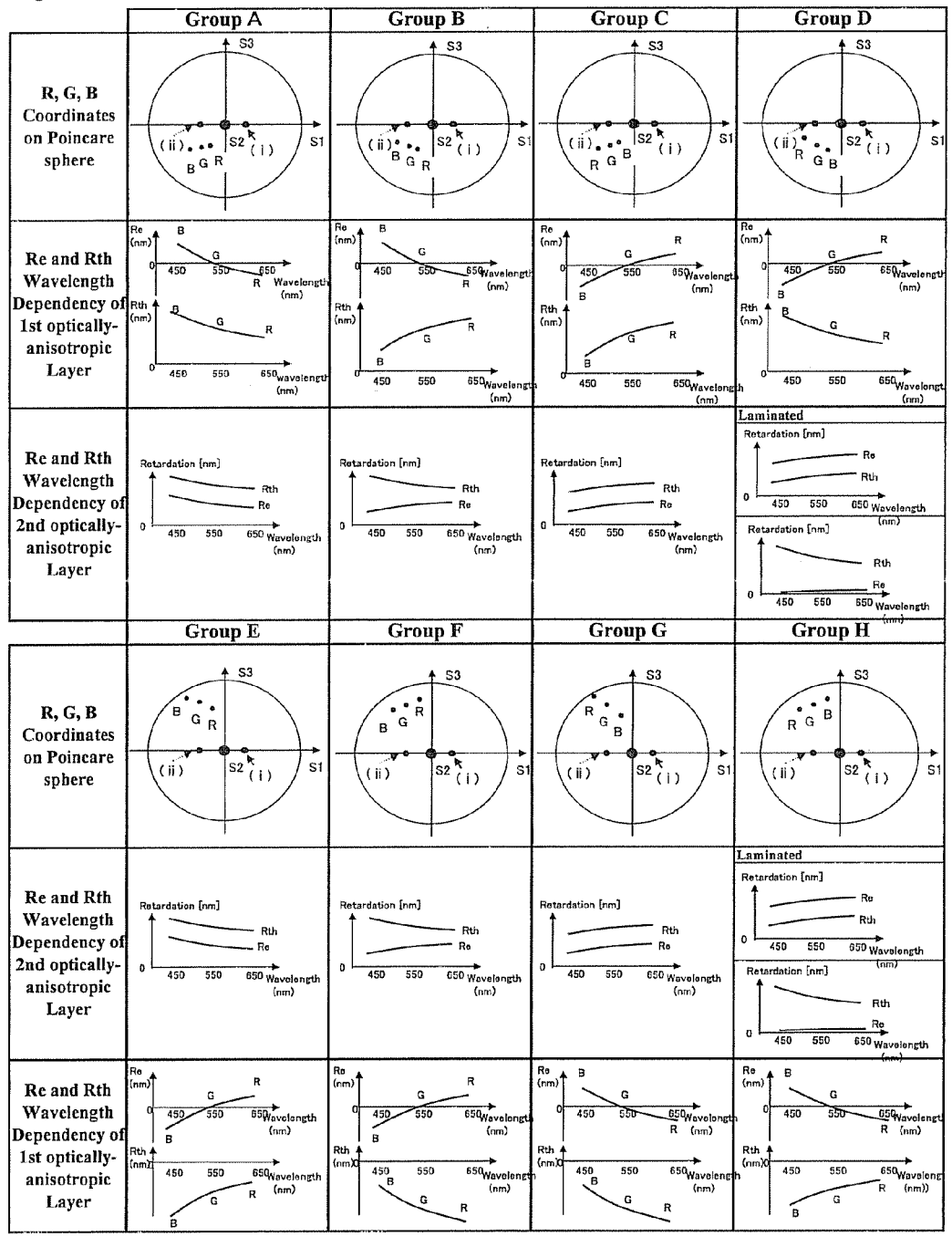
FIG. 4 is a view showing various embodiments of the liquid crystal display device of the invention, as grouped into Groups A to H.

FIG. 4 shows preferred combinations of the wavelength dependency of Re and Rth of the second optically anisotropic layer and the wavelength dependency of Re and Rth of the first optically anisotropic layer, as Groups A to H. The graphs in FIG. 4 are schematic ones for facilitating the understanding of their meanings, and are therefore not graphs formed through measurement of actual optical characteristics. The same shall apply also to the graphs in FIG. 6 to be mentioned hereinunder.

The group A is an embodiment in which the first optically anisotropic layer satisfies all the following expressions:

$$Re(450) > 0,$$

$$Re(650) < 0,$$

$$Rth(550) > 0, \text{ and}$$

$$|Rth(450)|/|Rth(650)| \geq 1.0.$$

Preferably, this embodiment is combined with a second optically anisotropic layer showing regular wavelength dispersion characteristics of both Re and Rth. More preferably in this embodiment, the first optically anisotropic layer satisfies Re(450)>5 nm and Re(650)<-5 nm. More preferably, the second optically anisotropic layer satisfies 0.70<Rth(450)/Rth(550)<1.15, even more preferably 0.90<Rth(450)/Rth(550)<1.10.

The group B is an embodiment in which the first optically anisotropic layer satisfies all the following expressions:

$$Re(450) > 0,$$

$$Re(650) < 0,$$

$$Rth(550) > 0, \text{ and}$$

$$|Rth(450)|/|Rth(650)| < 1.0.$$

Preferably, this embodiment is combined with a second optically anisotropic layer showing a reversed wavelength dispersion characteristic of Re and a regular wavelength dispersion characteristic of Rth. More preferably in this embodiment, the first optically anisotropic layer satisfies Re(450)>5 nm and Re(650)<-5 nm. More preferably, the second optically anisotropic layer satisfies Rth(450)/Rth(550)≧1.15 and Rth(550)/Rth(650)≧1.15, even more preferably Rth(450)/Rth(550)≧1.10.

The group C is an embodiment in which the first optically anisotropic layer satisfies all the following expressions:

$Re(450)<0$, $Re(650)>0$, $Rth(550)>0$, and $|Rth(450)|/|Rth(650)|<1.0$.

Preferably, this embodiment is combined with a second optically anisotropic layer showing reversed wavelength dispersion characteristics of both Re and Rth. More preferably in this embodiment, the first optically anisotropic layer satisfies Re(450)<−5 nm, and Re(650)>5 nm. More preferably, the second optically anisotropic layer satisfies Re(450)/Re(550)<0.70.

The group D is an embodiment in which the first optically anisotropic layer satisfies all the following expressions:

$Re(450)<0$, $Re(650)>0$, $Rth(550)>0$, and $|Rth(450)|/|Rth(650)|≧1.0$.

In this, preferably, the second optically anisotropic layer is a laminate of an optically anisotropic layer showing reversed wavelength dispersion characteristics of both Re and Rth and an optically anisotropic layer having Re values of nearly zero (0) at any visible wavelengths and showing a regular wavelength dispersion characteristic of Rth. More preferably in this embodiment, the first optically anisotropic layer satisfies Re(450)<−5 nm, and Re(650)>5 nm. More preferably, the second optically anisotropic layer is a laminate of an optically anisotropic layer satisfying Re(450)/Re(550)<0.80 and an optically anisotropic layer satisfying Rth(450)/Rth(550)>1.25; even more preferably a laminate of an optically anisotropic layer satisfying Re(450)/Re(550)<0.75 and an optically anisotropic layer satisfying Rth(450)/Rth(550)>1.30.

The group E is an embodiment in which the first optically anisotropic layer satisfies all the following expressions:

$Re(450)<0$, $Re(650)>0$, $Rth(550)<0$, and $|Rth(450)|/|Rth(650)|≧1.0$.

Preferably, this embodiment is combined with a second optically anisotropic layer showing regular wavelength dispersion characteristics of both Re and Rth. More preferably in this embodiment, the first optically anisotropic layer satisfies Re(450)<−5 nm, and Re(650)>5 nm. More preferably, the second optically anisotropic layer satisfies 0.70<Rth(450)/Rth(550)<1.15, more preferably 0.90<Rth(450)/Rth(550)<1.10.

The group F is an embodiment in which the first optically anisotropic layer satisfies all the following expressions:

$Re(450)<0$, $Re(650)>0$, $Rth(550)<0$, and $|Rth(450)|/|Rth(650)|<1.0$.

Preferably, this is combined with a second optically anisotropic layer showing a reversed wavelength dispersion characteristic of Re and a regular wavelength dispersion characteristic of Rth. More preferably in this embodiment, the first optically anisotropic layer satisfies Re(450)<−5 nm, and Re(650)>5 nm. More preferably, the second optically anisotropic layer satisfies Rth(450)/Rth(550)≧1.15 and Rth(550)/Rth(650)≧1.15, even more preferably Rth(450)/Rth(550)≧1.10.

The group G is an embodiment in which the first optically anisotropic layer satisfies all the following relations:

$Re(450)>0$, $Re(650)<0$, $Rth(550)<0$, and $|Rth(450)|/|Rth(650)|<1.0$.

Preferably, this is combined with a second optically anisotropic layer showing reversed wavelength dispersion characteristics of both Re and Rth. More preferably in this embodiment, the first optically anisotropic layer satisfies Re(450)<−5 nm, and Re(650)>5 nm. More preferably, the second optically anisotropic layer satisfies Re(450)/Re(550)<0.70.

The group H is an embodiment in which the first optically anisotropic layer satisfies all the following relations:

$Re(450)>0$, $Re(650)<0$, $Rth(550)<0$, and $|Rth(450)|/|Rth(650)|≧1.0$.

In this, preferably, the second optically anisotropic layer is a laminate of an optically anisotropic layer showing reversed wavelength dispersion characteristics of both Re and Rth and an optically anisotropic layer having Re values of nearly zero (0) at any visible wavelengths and showing a regular wavelength dispersion characteristic of Rth. More preferably in this embodiment, the first optically anisotropic layer satisfies Re(450)<−5 nm, and Re(650)>5 nm. More preferably, the second optically anisotropic layer is a laminate of an optically anisotropic layer satisfying Re(450)/Re(550)<0.80 and an optically anisotropic layer satisfying Rth(450)/Rth(550)>1.25; even more preferably a laminate of an optically anisotropic layer satisfying Re(450)/Re(550)<0.75 and an optically anisotropic layer satisfying Rth(450)/Rth(550)>1.30.

FIG. 1 shows an embodiment in which the first and second optically anisotropic layers are disposed to sandwich the liquid crystal cell therebetween, to which, however, the invention should not be limited. The invention also includes another embodiment in which both the first and second optically anisotropic layers are disposed between the liquid crystal cell and the surface-side polarizing element or between the liquid crystal cell and the backlight-side polarizing element.

The above-described embodiment is a type of a vertically aligned mode liquid crystal display device, to which, however, the invention should not be limited. The invention also includes any other horizontal alignment mode such as IPS mode.

Figure 5:
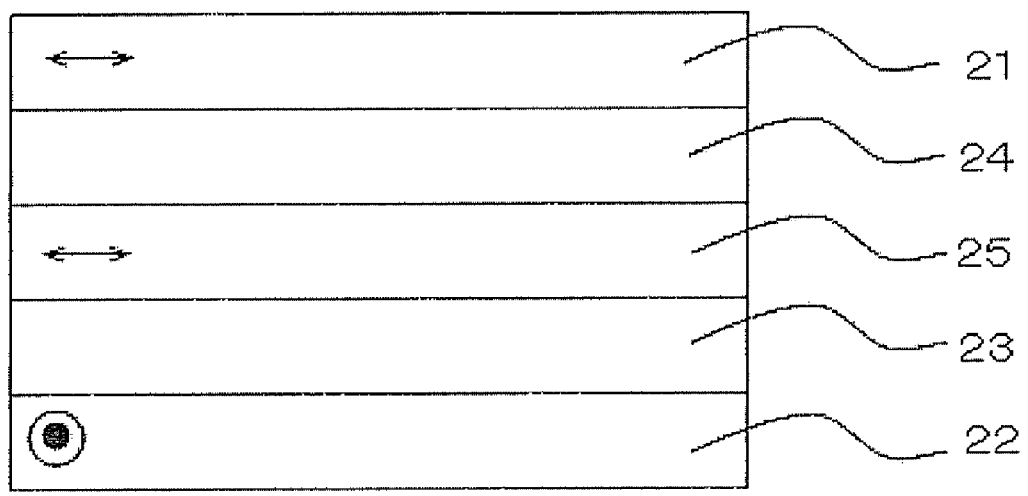
FIG. 5 is a schematic outline view of one example of the liquid crystal display device of the invention.

FIG. 5 is a schematic cross-sectional view showing an example of the invention applied to an IPS-mode liquid crystal display device. The liquid crystal display device of FIG. 5 comprises a pair of polarizing elements 21 and 22, an IPS-mode liquid crystal cell 23 disposed between the pair of polarizing elements, and as sandwiched between the polarizing element 21 and the liquid crystal cell 23, a first optically anisotropic layer 24 satisfying the above relations (1) and (2) and a second optically anisotropic layer 25 at least one optical axis. The polarizing elements 21 and 22 are so disposed that their absorption axes (the arrows in 21 and 22 in FIG. 5) are perpendicular to each other. The second optically anisotropic layer 25 is so disposed that its in-plane slow axis is parallel to the absorption axis of the polarizing element 21.

In FIG. 5, no layer is disposed between the polarizing element 22 and the liquid crystal cell 23; but in general, a protective film for the polarizing element 22 is disposed between them. In the embodiment of FIG. 5, the protective film for the polarizing element 22 that may be disposed between the element and the liquid crystal cell 23 is preferably a film having a retardation of nearly zero (0), and for example, the cellulose acylate film described in Japanese Laid-Open Patent Publication No. 2005-138375 is preferred for it.

The liquid crystal cell 23 is an IPS-mode liquid crystal cell, which is in a black state with under no voltage (or low voltage) applied thereto and is in a white state with a voltage applied thereto. On the surfaces of the upper and lower substrates of the liquid crystal cell that are in contact with the liquid crystal, formed is an alignment film; and accordingly, the liquid crystal molecules are aligned nearly parallel to the surfaces of the substrates, and depending on the direction of rubbing treatment applied to the alignment film, the liquid crystal molecules are so aligned that their major axes could be parallel to the absorption axis of the polarizing element on the backlight side (in FIG. 5, the polarizing element 22) in the black state. In other words, for the incident light running thereinto, the liquid crystal cell 23 acts like an A-plate having a slow axis in the direction parallel to the absorption axis of the polarizing element 22.

Figure 6:
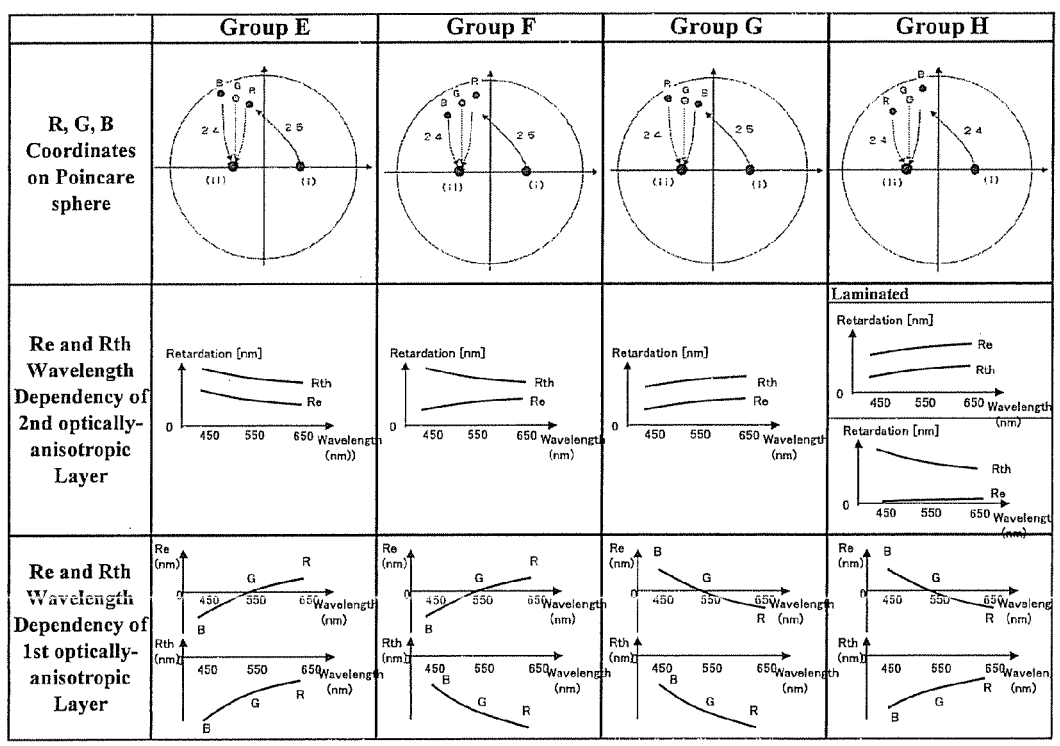
FIG. 6 is a view showing various embodiments of the liquid crystal display device of the invention having the constitution of FIG. 5, as grouped into Groups E to H.

FIG. 6 shows a view for explaining the compensatory mechanism of a liquid crystal display device having the constitution of FIG. 5 in the black state, with reference to a Poincare sphere. The groups E to H in FIG. 6 are groups of preferred embodiments of the Re and Rth wavelength dependency of the first and second optically anisotropic layers, and are the same as the groups E to H in FIG. 4.

The polarization state in light application to the polarizing element 22 in FIG. 5 is at the position (i). When the incident light has passed through the liquid crystal cell 23, then the polarization state changes depending on the birefringence of the liquid crystal cell 23; but as so mentioned in the above, since the liquid crystal cell 23 acts like an A-plate having a slow axis in the direction parallel to the absorption axis of the polarizing element 22, for the incident light running thereinto, the change may be expressed as a rotation around (i) as the center. Accordingly, the polarization state of the light having passed through the liquid crystal cell 23 does not change, still kept as (i). Afterwards, when the light passes through the second optically anisotropic layer 25, its polarization state is changed owing to the birefringence of the layer, and in addition, as shown in FIG. 6, depending on the Re and Rth wavelength dependency, the polarization state may differ at different wavelengths of R, G and B. According to the grouping shown in FIG. 6, the first optically anisotropic layer having predetermined Re and Rth wavelength dependency is selected, and the different polarization state of R, G and B that has separated by passing through the second optically anisotropic layer 25 may be thereby converted to the extinction point (ii) of the polarizing element 21.

Suitably combining the retardation values of the first and second optically anisotropic layers in relation to the optical characteristics of the liquid crystal cell makes it possible to realize a liquid crystal display device having a good viewing angle contrast and having little color change in any mode. In an embodiment having a vertically alignment mode (VA-mode) liquid crystal cell, the sum of Rth(550) of the first optically anisotropic layer and Rth(550) of the second optically anisotropic layer is preferably from 100 nm to 400 nm, more preferably from 200 nm to 300 nm. In an embodiment having a liquid crystal cell of a horizontal alignment mode such as IPS mode, the sum of Rth(550) of the first optically anisotropic layer and Rth(550) of the second optically anisotropic layer is preferably from −150 nm to 100 nm, more preferably from −100 nm to 50 nm.

The optical characteristics, the materials and the production methods for the first optically anisotropic layer and the second optically anisotropic layer usable in the invention are described in detail hereinunder.

[First Optically Anisotropic Layer]

In the invention, the first optically anisotropic layer shows a positive in-plane retardation (Re) at $\lambda 1$ and a negative Re at $\lambda 2$, both of $\lambda 1$ and $\lambda 2$ are within a visible wavelength range, and its absolute value of a thickness-direction retardation at 550 nm, |Rth(550)|, is equal to or more than 50 nm. Preferably, the first optically anisotropic layer satisfies the following relations:

$$Re(450) \times Re(650) < 0 \qquad (1)$$

$$Rth(550)/Re(550) > 10 \qquad (2).$$

The invention also includes an embodiment where Re of the first optically anisotropic layer satisfies Re(550)=0. Preferably, Rth(550)/Re(550)>15. The first optically anisotropic layer may contributes toward the reduction in the color change of the device, irrespective of its Rth(550); however, the color compensatory effect of the layer is higher when the value |Rth(550)| of the layer is larger. According to the invention, the |Rth(550)| value of the first optically anisotropic layer is equal to or more than 50 nm. And generally, the value of |Rth(550)| is preferably equal to or less than 200 nm, more preferably equal to or more than 140 nm, and much more preferably equal to or more than 80 nm.

On the other hand, |Re(550)| of the layer is preferably smaller. More preferably, |Re(550)|<20 nm.

The first optically anisotropic layer satisfying the relation (1) may be produced according to a method selected from various known methods. For example, the wavelength dispersion characteristics of retardation of a polymer film are affected by both of polarizability of a polymer main chain, which may generally be aligned along with the long direction of the film, and polarizability of a side chain aligned along with a direction perpendicular to the main chain. It is also affected by an absorption-peak wavelength of the film. Therefore, a polymer film satisfying the above mentioned relation (1) may be produced by controlling these factors which affect the wavelength dispersion characteristics of the retardation. For example, a cellulose acylate has at least one acyl group in the place of hydrogen atom of hydroxyl in a cellulose unit; and for the sake of existence of such an acyl group, it exhibits polarizability anisotropy in a direction perpendicular to the main chain. A polymer film satisfying the optical characteristics, which are required for the first anisotropic layers, may be produced by employing cellulose acylate. A polymer film satisfying the optical characteristics, which are required for the first anisotropic layers, may also be produced by employing polymer other than cellulose acylates, which is selected from polymers having a substituent exhibiting polarizability anisotropy in side chains.

For example, the crystallinity degree of the side chain can be controlled by setting a temperature and/or a period for a step of grasping a polymer film with clips or stretching a polymer film in at least one direction, which may achieve the preferred wavelength dispersion characteristic of Re.

[Second Optically Anisotropic Layer]

The LCD of the invention may comprise a second optically anisotropic layer having at least one optical axis. Having at least one optical axis, the second optically anisotropic layer is not specifically defined in terms of its other optical characteristics. For example, a retardation plate that is generally referred to as A-plate may be employed for the layer. In general, the second optically anisotropic layer preferably satisfies the following relations (3) and (4):

$$30 \text{ nm} < Re(550) < 400 \text{ nm} \quad (3),$$

$$-100 \text{ nm} < Rth(550) < 300 \text{ nm} \quad (4).$$

More preferably, the layer satisfies the following expression (3)' and/or the following expression (4)':

$$40 \text{ nm} < Re(550) < 300 \text{ nm} \quad (3)',$$

$$-50 \text{ nm} < Rth(550) < 250 \text{ nm} \quad (4)'.$$

The materials of the first optically anisotropic layer and the second optically anisotropic layers are not specifically defined. When the first and second optically anisotropic layers are polymer films, then they may be stuck to the polarizing element. The material of the polymer film is preferably excellent in the optical properties, the transparency, the mechanical strength, the thermal stability, the water shieldability and the isotropic property thereof. However, any material may be used herein, falling within the range satisfying the above-mentioned characteristics. Examples of the material includes polycarbonate polymers; polyester polymers such as polyethylene terephthalate and polyethylene naphthalate; acrylic polymers such as polymethyl methacrylate; styrenic polymers such as polystyrene and acrylonitrile-styrene copolymer (AS resin). As other examples of the material usable herein, further mentioned are polyolefins such as polyethylene, polypropylene; polyolefinic polymers such as ethylene-propylene copolymer; vinyl chloride polymers; amide polymers such as nylon, aromatic polyamide; imide polymers, sulfone polymers, polyether sulfone polymers, polyether ether ketone polymers, polyphenylene sulfide polymers, vinylidene chloride polymers, vinyl alcohol polymers, vinylbutyral polymers, arylate polymers, polyoxymethylene polymers, epoxy polymers; and mixtures of the above polymers.

As the material to form the polymer film, preferred is a thermoplastic norbornene resin. The thermoplastic norbornene resin includes Nippon Zeon's Zeonex, Zeonoa, and JSR's Arton.

As the material to form the polymer film, especially preferred is a cellulose polymer heretofore used as a transparent protective film for polarizer (hereinafter this may be referred to as cellulose acylate). One typical example of cellulose acylate is triacetyl cellulose. The cellulose material for cellulose triacylate includes cotton liter and wood pulp (hardwood pulp, softwood pulp), and cellulose acylate obtained from any such cellulose material is usable herein. As the case may be, those cellulose materials may be mixed for use herein. The cellulose materials are described in detail, for example, in Marusawa & Uda's "Plastic Material Lecture (17), cellulose resin" by Nikkan Kogyo Shinbun (1970) and Hatsumei Kyokai's Disclosure Bulletin 2001-1745 (pp. 7-8), and those celluloses described therein may be usable herein. There should not be any specific limitation to the cellulose acylate film for use in the invention.

Preferably, the cellulose acylate film for the first optically anisotropic layer is formed of a composition that contains a cellulose acylate having at least two substituents. Preferred examples of the cellulose acylate of the type include mixed fatty acid esters having a degree of acylation of from 2 to 2.9 and having a plural of acyl groups (for example, an acetyl group and an acyl group having 3 or 4 carbon atoms). Preferably, the degree of acylation of the mixed fatty acid ester is from 2.2 to 2.85, more preferably from 2.4 to 2.8. Also preferably, the degree of acetylation of the ester is less than 2.5, more preferably less than 1.9. In the fatty acid ester residue, it is desirable that the aliphatic acyl group has from 2 to 20 carbon atoms. Concretely, the group includes acetyl, propionyl, butyryl, isobutyryl, valeryl, pivaloyl, hexanoyl, octanoyl, lauroyl, stearoyl; and preferred are acetyl, propionyl and butyryl.

The cellulose acylate may be a mixed acid ester having a fatty acid acyl group and a substituted or unsubstituted acyl group.

The degree of substitution with an aromatic acyl group in a cellulose fatty acid monoester is preferably at most 2.0, more preferably from 0.1 to 2.0 relative to the remaining hydroxyl group. In a cellulose fatty acid diester (cellulose diacetate), it is preferably at most 1.0, more preferably from 0.1 to 1.0 relative to the remaining hydroxyl group.

Preferably, the cellulose acylate has a mass-average degree of polymerization of from 350 to 800, more preferably from 370 to 600. Also preferably, the cellulose acylate for use in the invention has a number-average molecular weight of from 70000 to 230000, more preferably from 75000 to 230000, even more preferably from 78000 to 120000.

The cellulose acylate may be produced, using an acid anhydride or an acid chloride as the acylating agent for it. One most general production method on an industrial scale comprises esterifying cellulose obtained from cotton linter, wood pulp or the like with a mixed acid component containing an organic acid corresponding to an acetyl group and other acyl group (acetic acid, propionic acid, butyric acid) or its acid anhydride (acetic anhydride, propionic anhydride, butyric anhydride).

The cellulose acylate film is preferably produced according to a solvent-casting method. Examples of production of cellulose acylate film according to a solvent-casting method are given in U.S. Pat. Nos. 2,336,310, 2,367,603, 2,492,078, 2,492,977, 2,492,978, 2,607,704, 2,739,069 and 2,739,070, British Patent Nos. 640731 and 736892, Japanese Examined Patent Publication Nos. 45-4554 and 49-5614, and Japanese Laid-Open Patent Publication Nos. 60-176834, 60-203430 and 62-115035, and their descriptions are referred to herein. The cellulose acylate film may be stretched. Regarding the method and condition for stretching treatment, for example, referred to are Japanese Laid-Open Patent Publication Nos. 62-115035, 4-152125, 4-284211, 4-298310 and 11-48271. The cellulose acylate film satisfying the optical characteristics, which are required for the first optically anisotropic layer, may be produced by stretching along the transversal direction, which is perpendicular to a longitudinal (machine) direction, a film obtained according to the solvent-casting method or, in the place of carrying out the stretching treatment, conveying it for a while during clipping it with tenter clips at a high temperature. As mentioned above, the temperature or the period for such a treatment may affect wavelength dispersion characteristics of Re of the film.

For producing the cellulose acylate film satisfying the conditions required as the first optically anisotropic layer, an Rth enhancer may be added to the cellulose acylate film. "Rth enhancer" as referred to herein is a compound capable of generating or increasing birefringence in the thickness direction of the film.

The Rth enhancer is preferably selected from compounds having an absorption maximum within a wavelength range of from 250 nm to 380 nm and having a large polarizability anisotropy.

The Rth enhancer is preferably selected from the compounds represented by the formula (1) described below.

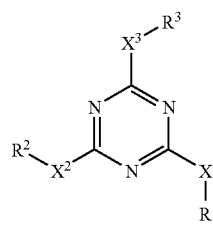

(I)

In the formula, $X^1$ represents a single bond, —$NR^4$—, —O— or —S—; $X^2$ represents a single bond, —$NR^5$—, —O— or —S—; and $X^3$ represents a single bond, —$NR^6$—, —O— or —S—. And $R^1$, $R^2$ and $R^3$ respectively represent an alkyl group, an alkenyl group, an aryl group or a heterocyclic group; $R^4$, $R^5$ and $R^6$ respectively represent a hydrogen atom, an alkyl group, an alkenyl group, an aryl group or a heterocyclic group.

Preferable examples, I-(1) to IV-(10), of the compound represented by the formula (I) include, but are not limited to, those shown below.

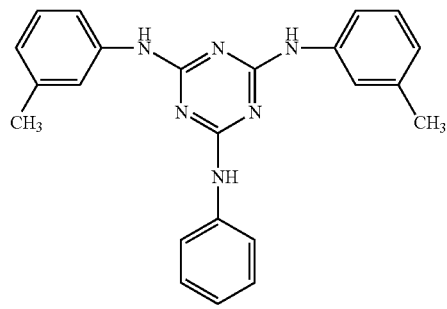

I-(1)

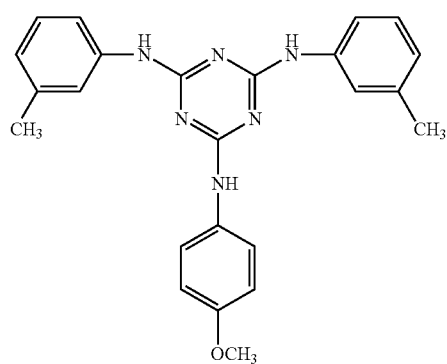

I-(2)

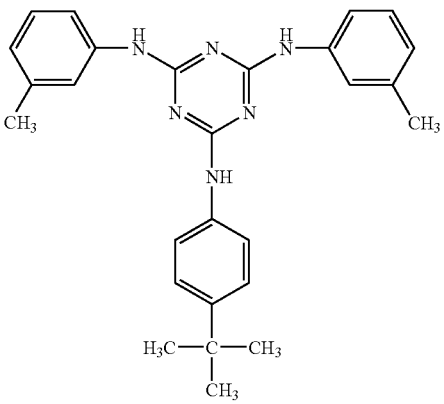

I-(3)

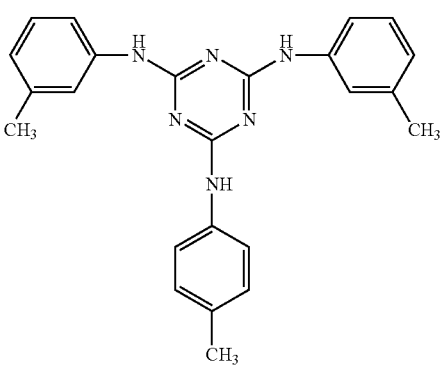

I-(4)

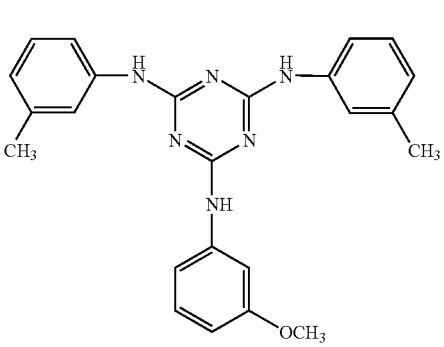

I-(5)

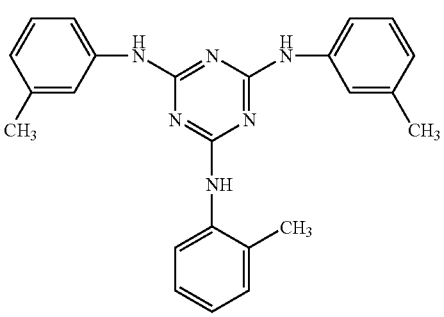

I-(6)

-continued
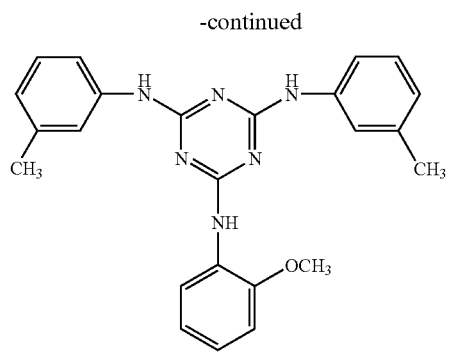
I-(7)
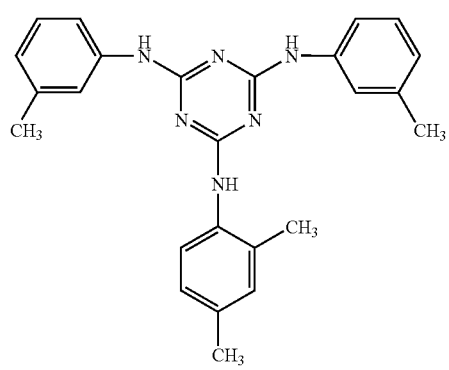
I-(8)
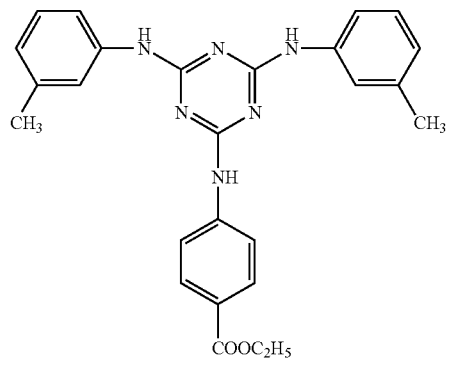
I-(9)
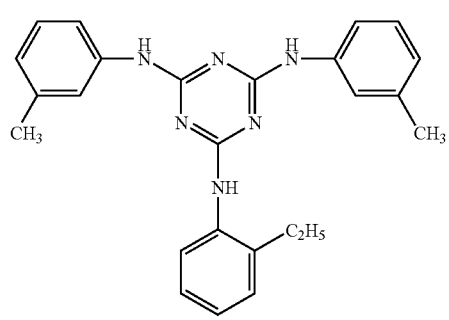
I-(10)
-continued
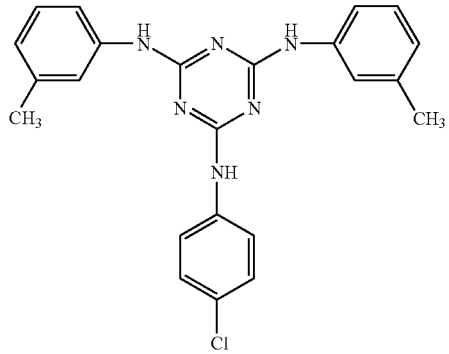
I-(11)
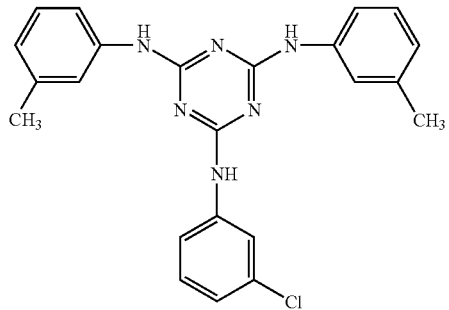
I-(12)
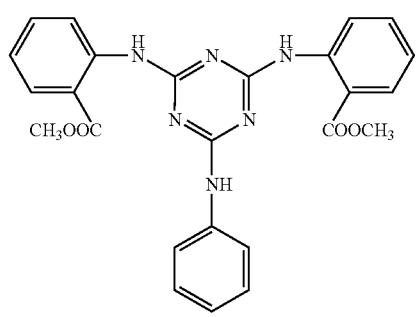
I-(13)
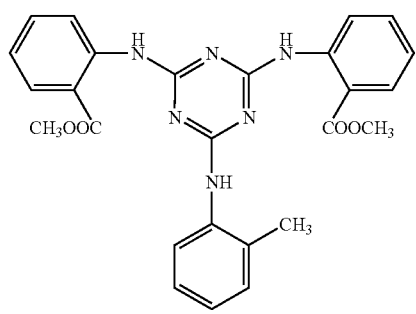
I-(14)
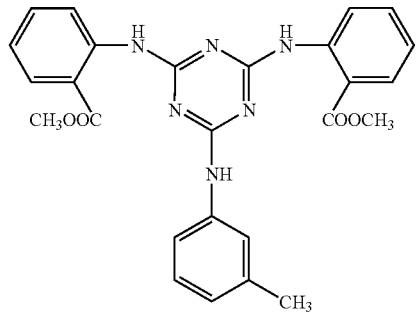
I-(15)

-continued

I-(16)

I-(17)

I-(18)

I-(19)

I-(20)

I-(21)

I-(22)

I-(23)

I-(24)
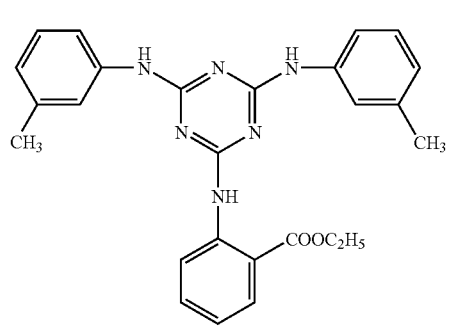
I-(25)
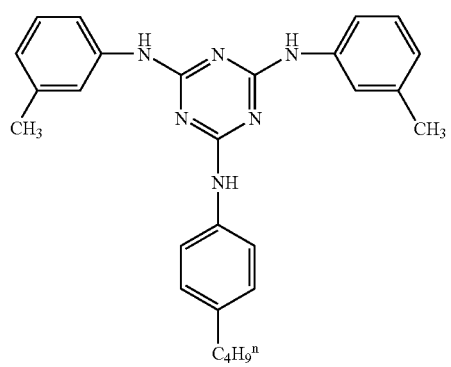
I-(26)
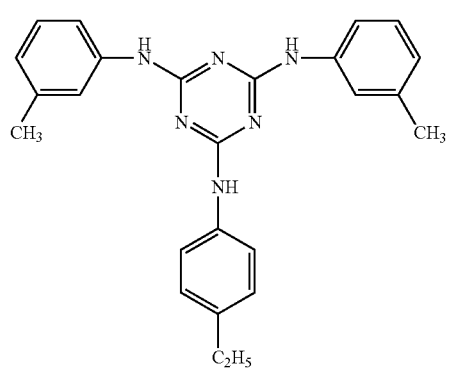
I-(27)
I-(28)
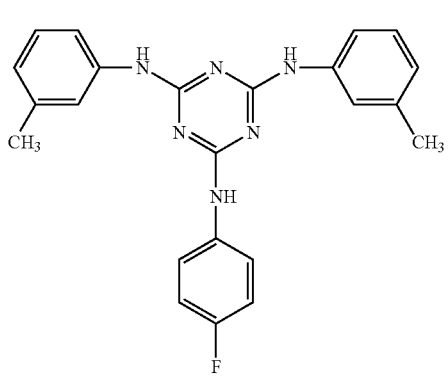
I-(29)
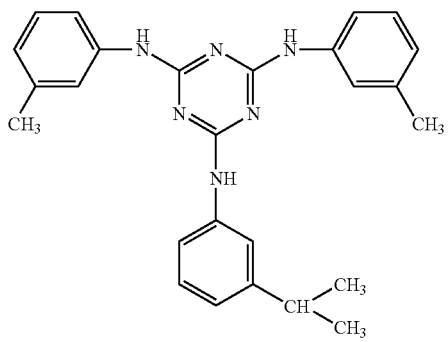
I-(30)
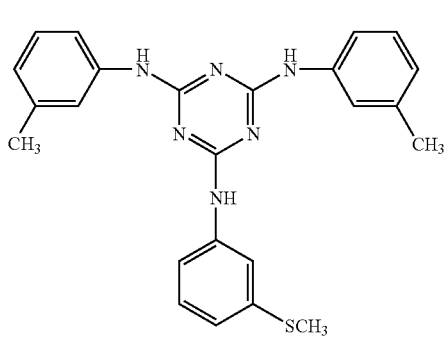
I-(31)

-continued

I-(32)
I-(33)
I-(34)
I-(35)
I-(36)
I-(37)
I-(38)
I-(39)
I-(40)

-continued
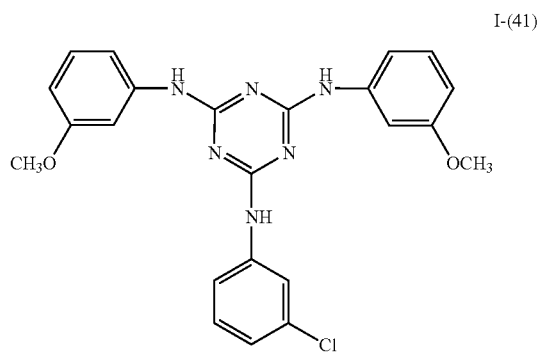
I-(41)
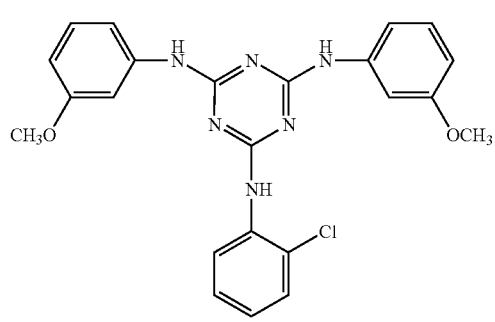
I-(42)
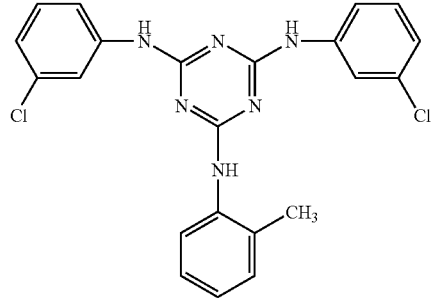
I-(43)
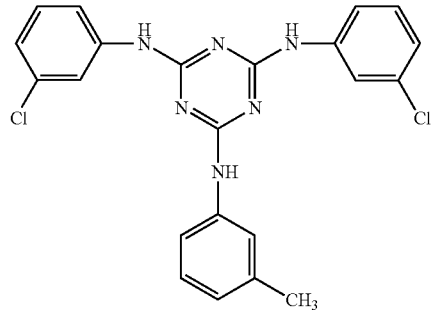
I-(44)
-continued
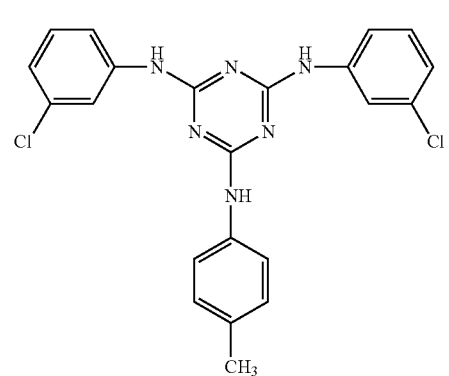
I-(45)
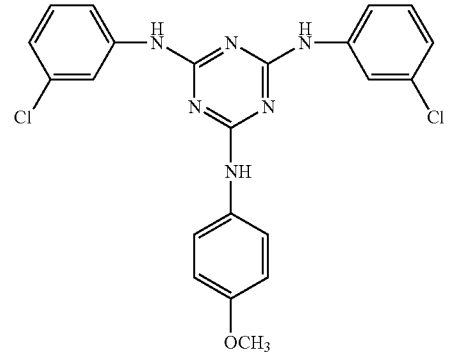
I-(46)
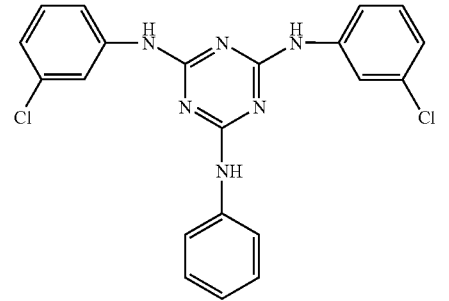
I-(47)
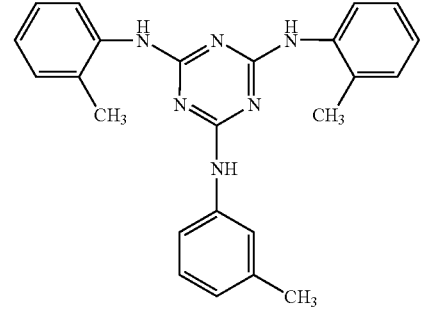
I-(48)

-continued
I-(49)
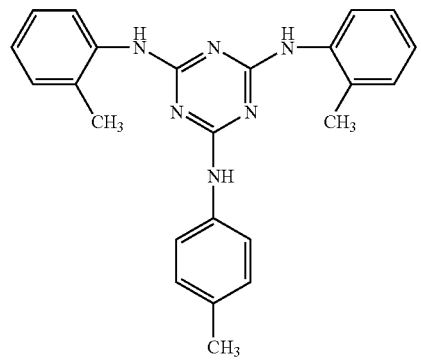
I-(50)
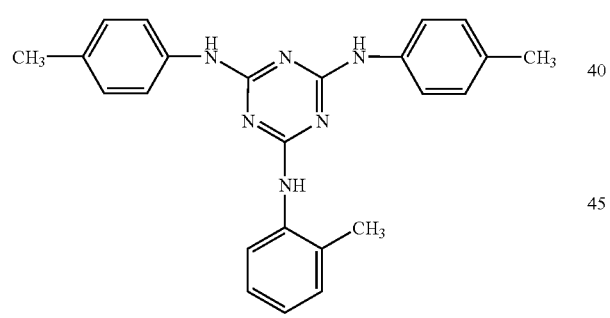
II-(1)
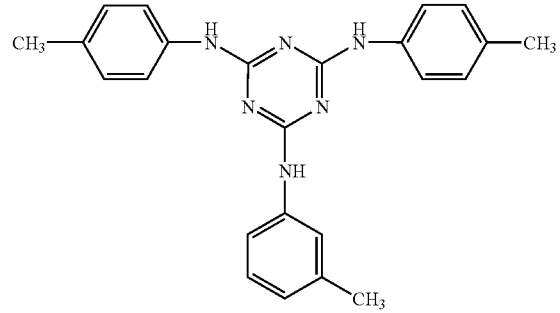
II-(2)
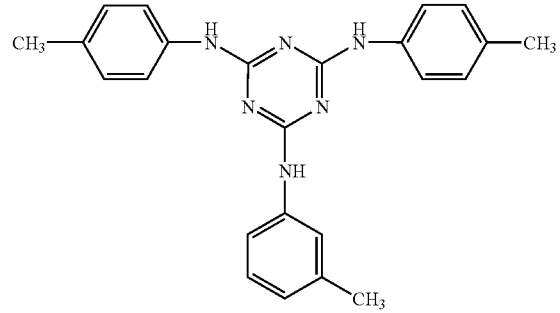
-continued
II-(3)
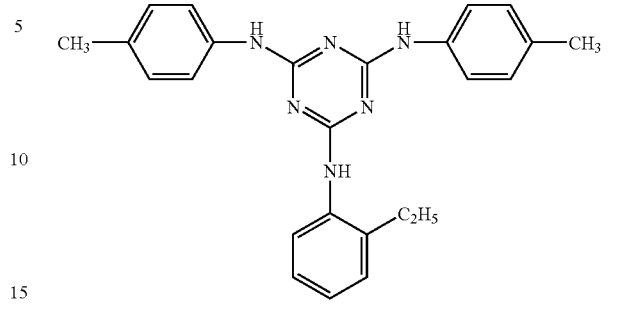
II-(4)
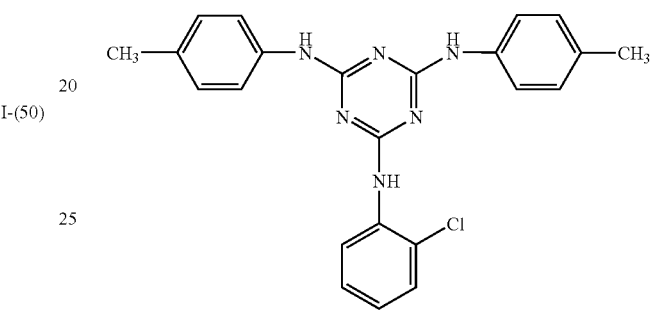
II-(5)
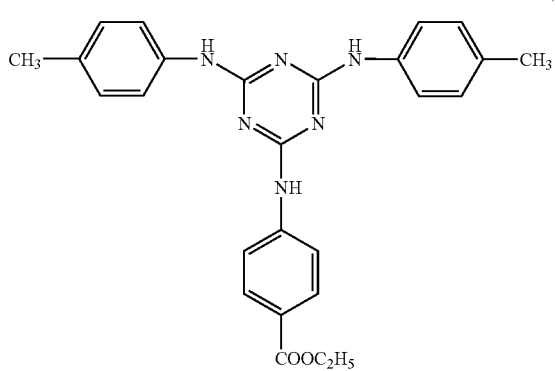
II-(6)
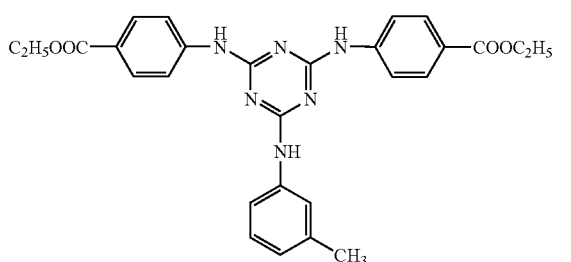
II-(7)
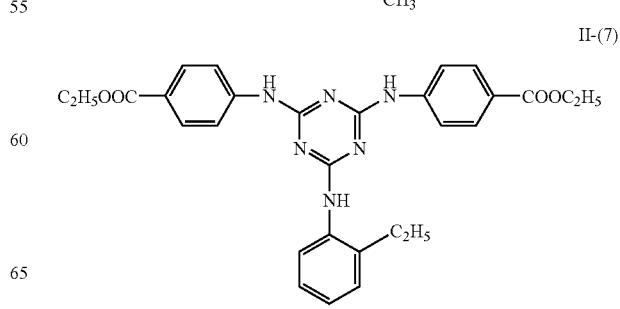

-continued
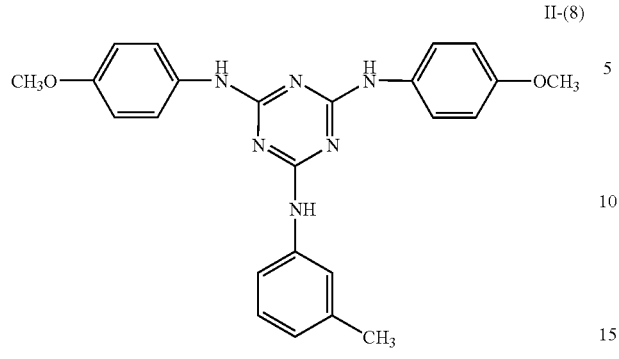
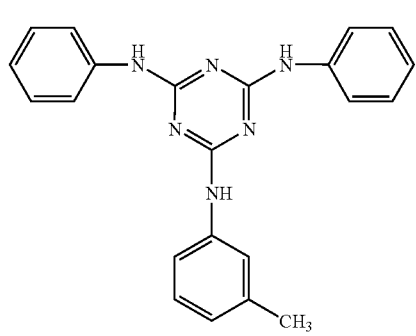
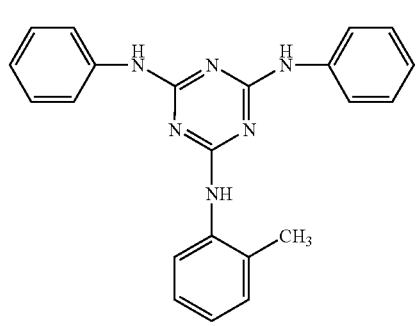
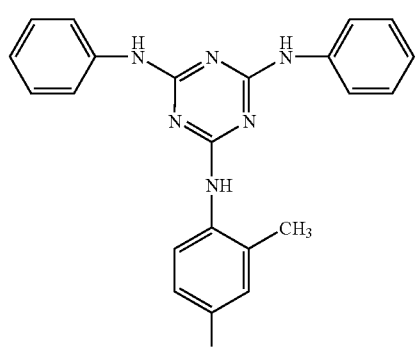
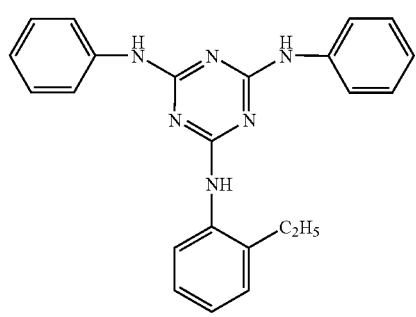
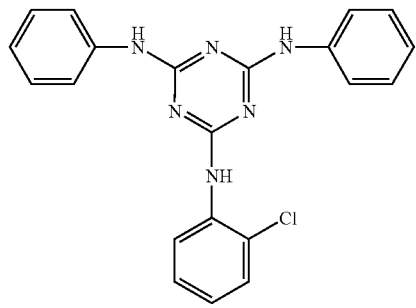

-continued
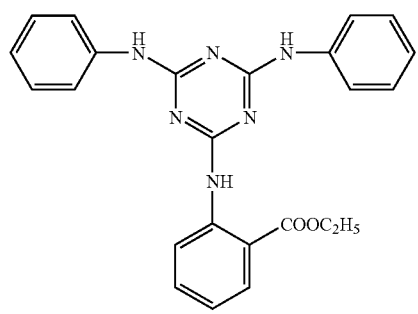
III-(8)
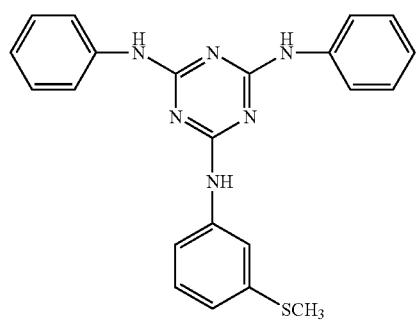
III-(9)
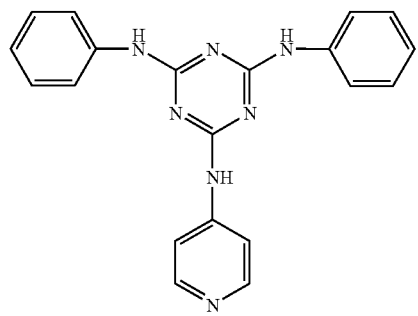
III-(10)
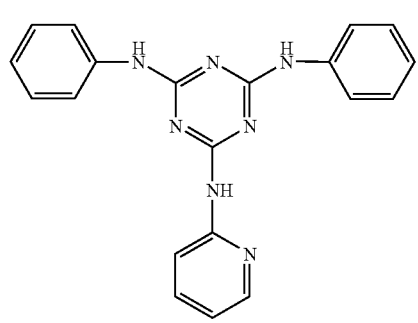
III-(11)
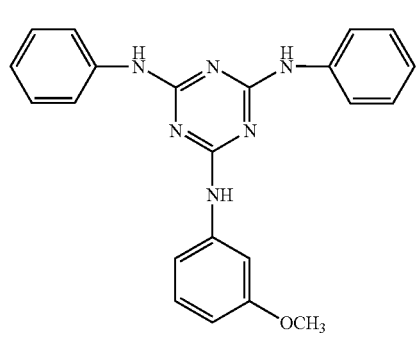
III-(12)
-continued
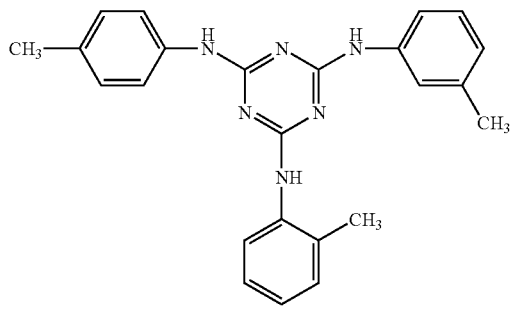
IV-(1)
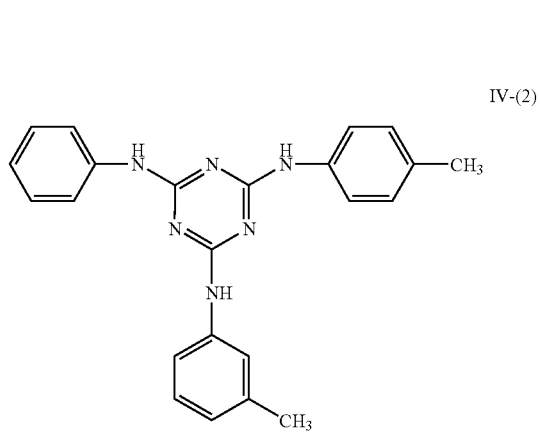
IV-(2)
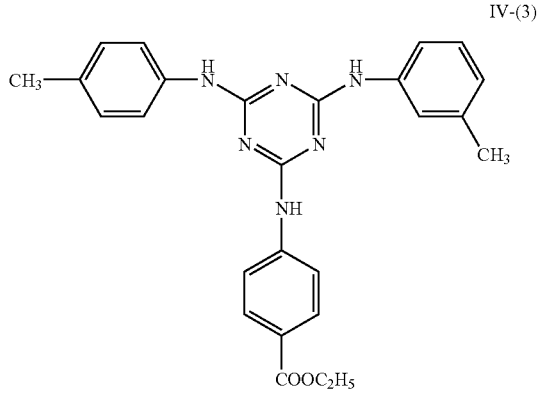
IV-(3)
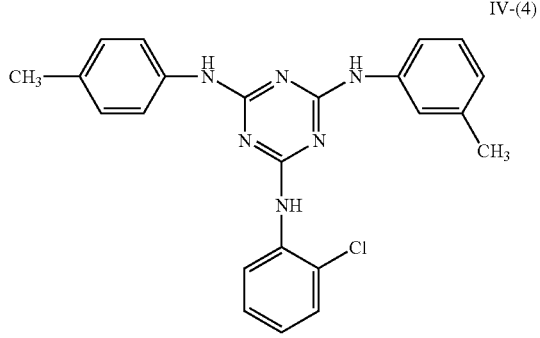
IV-(4)

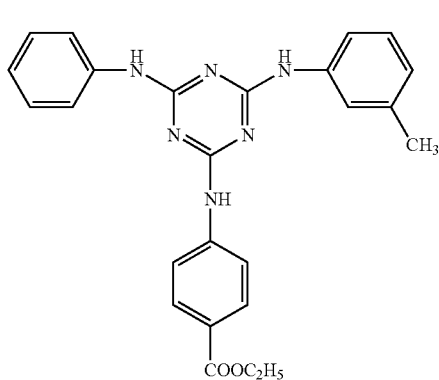

IV-(5)

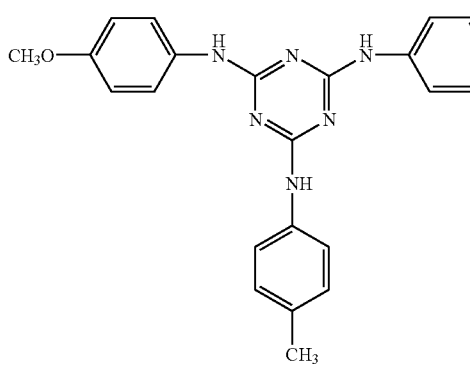

IV-(6)

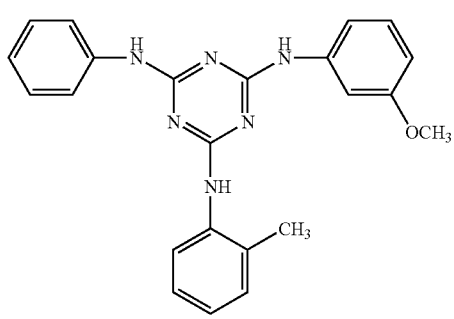

IV-(7)

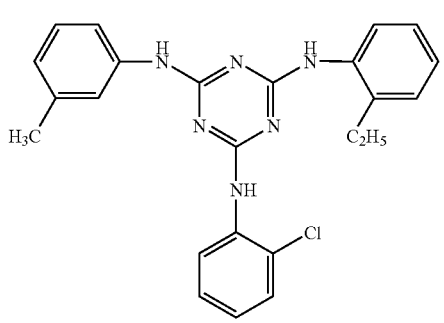

IV-(8)

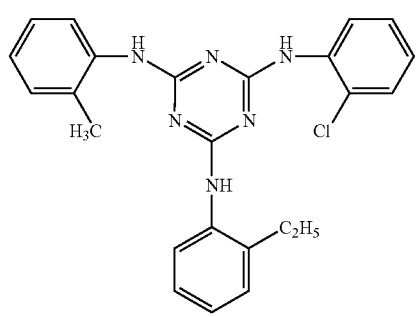

IV-(9)

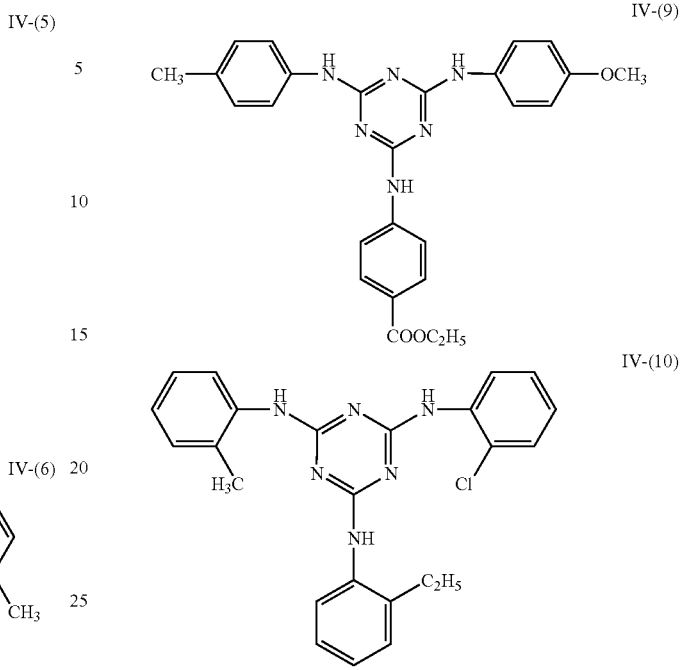

IV-(10)

The Rth enhancer is also preferably selected from the compounds represented by the formula (III).

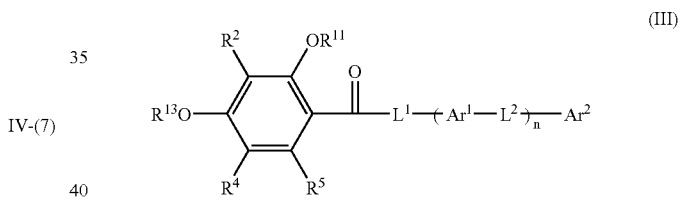

(III)

In the formula (III), $R^2$, $R^4$ and $R^5$ respectively represent a hydrogen atom or a substituent; $R^{11}$ and $R^{13}$ respectively represent a hydrogen atom or an alkyl group; and $L^1$ and $L^2$ respectively represent a single bond or a bivalent linking group. In the formula, $Ar^1$ represents an arylene group or a aromatic heterocyclic group; $Ar^2$ represents an arylene group or an aromatic heterocyclic group; n is an integer equal to or more than 3; "n" types of $L^2$ and $Ar^1$ may be same or different from each other. $R^{11}$ and $R^{13}$ are different from each other, and the alkyl group represented by $R^{13}$ doesn't include any hetero atoms.

In the formula (III), $R^2$, $R^4$ and $R^5$ respectively represent a hydrogen atom or a substituent. The substituent may be selected from Substituent Group T described later.

In the formula (III), $R^2$ preferably represents a hydrogen atom, an alkyl group, an alkoxy group, an amino group or hydroxy; more preferably a hydrogen atom, an alkyl group or an alkoxy group; much more preferably a hydrogen atom, a $C_{1-4}$ alkyl group such as methyl or a $C_{1-12}$ (the preferred is $C_{1-8}$, the more preferred is $C_{1-6}$ and the especially preferred is $C_{1-4}$) alkoxy group; especially preferably a hydrogen atom, a $C_{1-4}$ alkyl group or a $C_{1-4}$ alkoxy group; and most preferably a hydrogen atom or methoxy.

In the formula (III), $R^4$ preferably represents a hydrogen atom or an electron donating substituent; more preferably a hydrogen atom, an alkyl group, an alkoxy group, an amino group or hydroxy; much more preferably a hydrogen atom, a $C_{1-4}$ alkyl group or a $C_{1-12}$ (the preferred is $C_{1-8}$, the more preferred is $C_{1-6}$ and the especially preferred is $C_{1-4}$) alkoxy group; and especially preferably a hydrogen atom, a $C_{1-4}$ alkyl group or a $C_{1-4}$ alkoxy group; and most preferably a hydrogen atom or methoxy.

In the formula (III), $R^5$ preferably represents a hydrogen atom, a halogen atom, an alkyl group, an alkoxy group, an amino group or hydroxy; more preferably a hydrogen atom, an alkyl group or an alkoxy group; much more preferably a hydrogen atom, a $C_{1-4}$ alkyl group such as methyl or a C1-12 (the preferred is $C_{1-8}$, the more preferred is $C_{1-6}$ and the especially preferred is $C_{1-4}$) alkoxy group; especially preferably a hydrogen atom, methyl or methoxy; and most preferably a hydrogen atom.

In the formula (III), $R^{11}$ and $R^{13}$ respectively represent a hydrogen atom or an alkyl group, provided that $R^{11}$ and $R^{13}$ are different from each other and the alkyl group represented by $R^{13}$ doesn't include any hetero atoms. The term "hetero atom" is used for any atoms other than hydrogen and carbon atoms and examples of the hetero atom include oxygen, nitrogen, sulfur, phosphorus, halogen (F, Cl, Br, I) and boron atoms.

The alkyl group represented $R^{11}$ or $R^{13}$ may have a linear or branched chain structure or a cyclic structure, and be selected from not only non-substituted alkyl groups but also substituted alkyl groups. The alkyl group is preferably selected from substituted or non-substituted $C_{1-30}$ linear alkyl groups, substituted or non-substituted $C_{3-30}$ cycloalkyl groups, substituted or non-substituted $C_{5-30}$ bicycloalkyl groups, namely monovalent groups made of $C_{5-30}$ bicycloalkanes by removing a hydrogen atom therefrom, and tricycloalkyl groups.

Preferable examples of the alkyl group represented by $R^{11}$ or $R^{13}$ include methyl, ethyl, n-propyl, isopropyl, n-butyl, sec-butyl, n-pentyl, iso-pentyl, n-hexyl, n-heptyl, n-octyl, tert-octyl, 2-ethylhexyl, n-nonyl, 1,1,3-trimethyl hexyl, n-decyl, 2-hexyldecyl, cyclohexyl, cycloheptyl, 2-hexenyl, oleyl, lynoleyl, and lynolenyl. Examples of the cycloalkyl group include cyclohexyl, cyclopentyl, 4-n-dodecylcyclohexy; and examples of the bicycloalkyl group include bicyclo[1,2,2]heptane-2-yl and bicyclo[2,2,2]octane-3-yl.

$R^{11}$ preferably represents a hydrogen atom, methyl, ethyl, n-propyl or iso-propyl; and more preferably a hydrogen atom or methyl; and most preferably methyl.

$R^{13}$ preferably represents a $C_2$ or longer alkyl group, and more preferably a $C_3$ or longer alkyl group. Among theses, branched or cyclic alkyl groups are preferred.

Specific examples (O-1~O-20) of the alkyl group represented by $R^{13}$ include, but are not limited to, those shown below. It is noted that "#" means the position of the oxygen atom side.

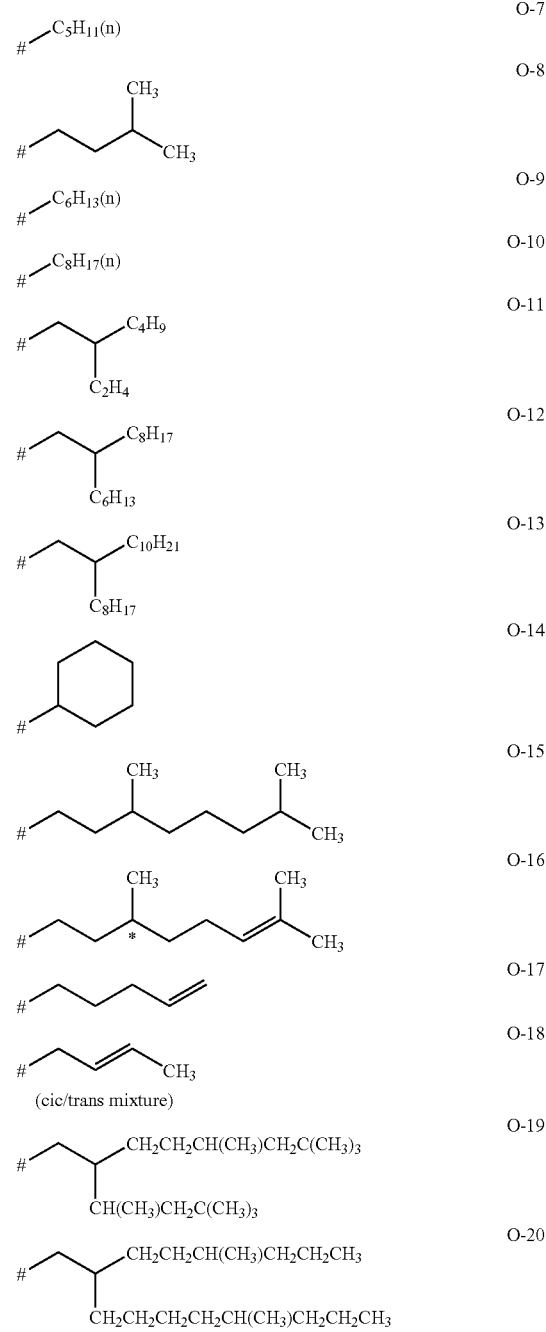

In the formula (III), $Ar^1$ represents an arylene group or an aromatic heterocyclic group and $Ar^1$ in each repeating unit may be same or different.

In the formula (III), $Ar^2$ represents an aryl group or an aromatic heterocyclic group.

The arylene group presented by $Ar^1$ in the formula (III) may be selected from $C_{6-30}$ arylene groups, and have a single ring structure or a condensed ring structure with another ring. And the arylene group may have at least one substituent, and the substituent may be selected from Substituent Group T described later. The arylene group represented by $Ar^1$ is preferably selected from $C_{6-20}$, more preferably $C_{6-12}$ arylene groups, such as phenylene, p-methylphenylen and naphtylene.

The arylene group presented by $Ar^2$ in the formula (III) may be selected from $C_{6-30}$ arylene groups, and have a single ring structure or a condensed ring structure with another ring. And the arylene group may have at least one substituent, and the substituent may be selected from Substituent Group T described later. The arylene group represented by $Ar^2$ is preferably selected from $C_{6-20}$, more preferably $C_{6-12}$ arylene groups, such as phenylene, p-methylphenylen and naphtylene.

The aromatic heterocyclic group represented by $Ar^1$ or $Ar^2$ in the formula (III) may be selected from the groups of aromatic rings in which at least one hetero atom selected from oxygen, nitrogen and sulfur atoms is embedded, and is preferably selected from the groups of 5- or 6-membered aromatic rings in which at least one of a nitrogen and sulfur atoms is embedded. The aromatic heterocyclic group may have at least one substituent. The substituent may be selected from Substituent Group T.

Examples of the aromatic heterocyclic group represented by $Ar^1$ or $Ar^2$ in the formula (III) include furan, pyrrole, thiophene, imidazole, pyrazole, pyridine, pyrazine, pyridazine, triazole, triazine, indole, indazole, purine, thiazole, thiadiazole, oxazoline, oxazole, oxadiazole, quinoline, isoquinoline, phthalazine, naphthylidine, quinoxaline, quinazoline, cinnoline, pteridine, acridine, phenanthroline, phenadine, tetrazole, benzimidazole, benzoxazole, benzthiazole, benztriazole, tetraza indeline, pyrrolotriazole and pyrazotriazole. Preferred examples of the aromatic heterocyclic group include benzimidazole, benzoxazole, benzthiazole and benztriazole.

In the formula (III), $L^1$ and $L^2$ respectively represent a single bond or a bivalent linking group. $L^1$ and $L^2$ may be same or different from each other. And $L^2$ in each repeating unit may be same or different from each other.

The bivalent linking group is preferably selected from the group consisting of —O—, —NR— (R represents a hydrogen atom or a substituted or non-substituted alkyl or aryl group), —CO—, —SO$_2$—, —S—, an alkylene group, a substituted alkylene group, an alkenylene group, a substituted alkenylene group, an alkynylene group, a substituted alkynylene group and any combinations of two or more selected therefrom; and more preferably from the group consisting of —O—, —NR—, —CO—, —SO$_2$NR—, —NRSO$_2$—, —CONR—, —NRCO—, —COO—, —OCO— and an alkynylene group. R preferably represents a hydrogen atom.

In the compound represented by the formula (III), $Ar^1$ binds to $L^1$ and $L^2$. For the compound having a phenylene as $Ar^1$, it is preferable that $L^1$—$Ar^1$—$L^2$ and $L^2$—$Ar^1$—$L^2$ are in a para-position (1,4-position) relation.

In the formula (III), n is an integer equal to or more than 3, preferably from 3 to 7, more preferably from 3 to 6 and much more preferably from 3 to 5.

Preferable examples of the formula (III) include the compounds represented by the formula (IV) and formula (V) shown below.

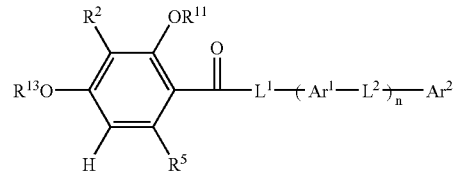

In the formula (IV), $R^2$ and $R^5$ respectively represent a hydrogen atom or a substituent; $R^{11}$ and $R^{13}$ respectively represent a hydrogen atom or an alkyl group; $L^1$ and $L^2$ respectively represent a single bond or a bivalent linking group; $Ar^1$ represents an arylene group or an aromatic heterocyclic group; $Ar^2$ represents an arylene group or an aromatic heterocyclic group; n is an integer equal to or more than 3; the "n" types of $L^2$ or $Ar^1$ may be same or different from each other; provided that $R^{11}$ and $R^{13}$ are different from each other and the alkyl group represented by $R^{13}$ doesn't include any hetero atoms.

In the formula (IV), the meanings of $R^2$, $R^5$, $R^{11}$ and $R^{13}$ are same as those in the formula (III); and preferred examples of $R^2$, $R^5$, $R^{11}$ and $R^{13}$ are same as those in the formula (III). In the formula (IV), the meanings of $L^1$, $L^2$, $Ar^1$ and $Ar^2$ are same as those in the formula (III); and preferred examples of $L^1$, $L^2$, $Ar^1$ and $Ar^2$ are same as those in the formula $$\underset{\underset{R^{14}O}{\underset{|}{\phantom{X}}}\phantom{XXX}\underset{R^5}{\phantom{X}}}{\overset{\overset{R^2}{\phantom{X}}\phantom{XXX}\overset{OR^{11}}{\phantom{X}}}{\phantom{XXXXX}}}\overset{O}{\underset{\phantom{X}}{\|}}\!\!-\!\!L^1\!\!-\!\!(Ar^1\!\!-\!\!L^2)_n\!\!-\!\!Ar^2 \qquad (V)$$

In the formula (V), $R^2$ and $R^5$ respectively represent a hydrogen atom or a substituent; $R^{11}$ and $R^{13}$ respectively represent a hydrogen atom or an alkyl group; $L^1$ and $L^2$ respectively represent a single bond or a bivalent linking group; $Ar^1$ represents an arylene group or an aromatic heterocyclic group; $Ar^2$ represents an arylene group or an aromatic heterocyclic group; n is an integer equal to or more than 3; the "n" types of $L^2$ or $Ar^1$ may be same or different from each other; provided that $R^{11}$ and $R^{13}$ are different from each other and the alkyl group represented by $R^{13}$ doesn't include any hetero atoms.

In the formula (V), the meanings of $R^2$, $R^5$, $R^{11}$ and $R^{13}$ are same as those in the formula (III); and preferred examples of $R^2$, $R^5$ and $R^{11}$ are same as those in the formula (III). In the formula (V), the meanings of $L^1$, $L^2$, $Ar^1$ and $Ar^2$ are same as those in the formula (III); and preferred examples of $L^1$, $L^2$, $Ar^1$ and $Ar^2$ are same as those in the formula (III).

In the formula (V), $R^{14}$ represents a hydrogen atom or an alkyl group; and examples of the alkyl group are same as those preferably exemplified as an alkyl group represented by $R^{11}$ or $R^{13}$. in the formula, $R^{14}$ preferably represents a hydrogen atom or a $C_{1-4}$ alkyl group, more preferably a hydrogen atom or a $C_{1-3}$ alkyl group, and much more preferably methyl. In the formula, $R^{11}$ and $R^{14}$ may be same or different from each other, and it is most preferred that both of $R^{11}$ and $R^{14}$ are methyl.

Preferable examples of the compound represented by the formula (V) include the compounds represented by the formula (V-A) and (V-B).

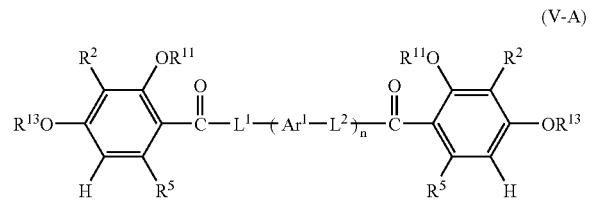

(V-A)

In the formula (V-A), $R^2$ and $R^5$ respectively represent a hydrogen atom or a substituent; $R^{11}$ and $R^{13}$ respectively represent a hydrogen atom or an alkyl group; $L^1$ and $L^2$ respectively represent a single bond or a bivalent linking group; $Ar^1$ represents an arylene group or an aromatic heterocyclic group; n is an integer equal to or more than 3; the "n" types of $L^2$ or $Ar^1$ may be same or different from each other; provided that $R^{11}$ and $R^{13}$ are different from each other and the alkyl group represented by $R^{13}$ doesn't include any hetero atoms.

In the formula (V-A), the meanings and preferable examples of $R^2$, $R^5$, $R^{11}$, $R^{13}$, $L^1$, $L^2$, $Ar^1$ and n may be same as those in the formula (III).

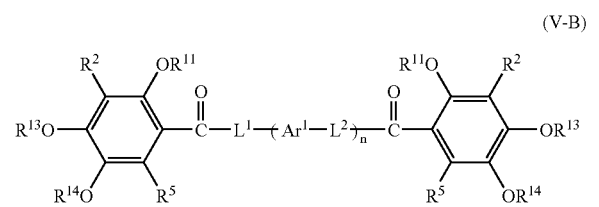

(V-B)

In the formula (V-B), $R^2$ and $R^5$ respectively represent a hydrogen atom or a substituent; $R^{11}$, $R^{13}$ and $R^{14}$ respectively represent a hydrogen atom or an alkyl group; $L^1$ and $L^2$ respectively represent a single bond or a bivalent linking group; $Ar^1$ represents an arylene group or an aromatic heterocyclic group; n is an integer equal to or more than 3; the "n" types of $L^2$ or $Ar^1$ may be same or different from each other; provided that $R^{11}$ and $R^{13}$ are different from each other and the alkyl group represented by $R^{13}$ doesn't include any hetero atoms.

In the formula (V-B), the meanings and preferable examples of $R^2$, $R^5$, $R^{11}$, $R^{13}$, $R^{14}$ $L^1$, $L^2$, $Ar^1$ and n may be same as those in the formula (III).

"Substituent Group T" will be described below.

Substituent Group T:

A halogen atom (fluorine, chlorine bromine or iodine atom), an alkyl group (desirably a substituted or non-substituted $C_{1-30}$ alkyl group) such as methyl, ethyl, n-propyl, isopropyl, tert-butyl, n-octyl and 2-ethylhexyl; a cycloalkyl group (desirably a substituted or non-substituted $C_{3-30}$ cycloalkyl group) such as cyclohexyl, cyclopentyl and 4-n-dodecylcyclohexy; a bicycloalkyl group (desirably a substituted or non-substituted bicycloalkyl group) such as bicyclo [1,2,2]heptane-2-yl and bicyclo[2,2,2]octane-3-yl; an alkenyl group (desirably a substituted or non-substituted $C_{2-30}$ alkenyl group) such as vinyl and allyl; a cycloalkenyl group (desirably a substituted or non-substituted $C_{3-30}$ cycloalkyl group which is made of a substituted or non-substituted $C_{3-30}$ cycloalkene by removing one hydrogen atom therefrom) such as 2-cyclopenten-1-yl and 2-cyclohexene-1-yl; a bicycloalkenyl group (desirably a substituted or non-substituted $C_{5-30}$ bicycloalkenyl group which is made of bicycloalkene by removing one hydrogen atom therefrom) such as bicyclo [2,2,1]hept-2-en-1-yl and bicyclo[2,2,2]oct-2-en-4-yl; an alkynyl group (desirably a substituted or non-substituted $C_{2-30}$ alkynyl group) such as ethynyl and propargyl; an aryl group (desirably a substituted or non-substituted $C_{6-30}$ aryl group) such as phenyl, p-tolyl and naphthyl; a hetero cyclic group (desirably a residue made of a substituted or non-substituted, aromatic or non-aromatic heterocyclic compound which is preferably selected from 5-membered and 6-membered heterocyclic compound) such as 2-furyl, 2-thienyl, 2-pyrimidinyl and 2-benzthiazolyl; cyano, hydroxyl, nitro, carboxyl, an alkoxy group (desirably a substituted or non-substituted $C_{1-30}$ alkoxy group) such as methoxy, ethoxy, isopropoxy, t-butoxy, n-octyloxy and 2-methoxyethoxy; or butoxy; an aryloxy group (desirably a substituted or non-substituted $C_{6-30}$ aryloxy group) such as phenoxy, 2-methylphenoxy, 4-tert-butylphenoxy, 3-nitrophenoxy and 2-tetradecanoylaminophenoxy; a silyloxy group (desirably a substituted or non-substituted $C_{3-20}$ silyloxy group) such as trimethyl silyloxy and tert-butyl dimethyl silyloxy; a heterocyclic oxy group (desirably a substituted or non-substituted $C_{2-30}$ heterocyclic oxy group) such as 1-phenyltetrazole-5-xoy and 2-tetrahydro pyranyl oxy; an acyloxy group (desirably formyloxy, a substituted or non-substituted $C_{2-30}$ alkyl carbonyloxy, or a substituted or non-substituted $C_{6-30}$ aryl carbonyloxy) such as formyloxy, acetoxy, pivaloyloxy, stearoyloxy, benzoyloxy and p-methoxyphenyl carbonyloxy; a carbamoyloxy group (desirably a substituted or non-substituted $C_{1-30}$ carbamoyloxy group) such as N,N-dimethyl carbamoyloxy, N,N-diethyl carbamoyloxy, morpholino oxy, N,N-di-n-octylamino carbonyloxy and N-n-octylcarbamoyloxy; an alkoxycarbonyloxy group (desirably a substituted or non-substituted $C_{2-30}$ alkoxycarbonyloxy group) such as methoxycarbonyloxy, ethoxycarbonyloxy, tert-butoxycarbonyloxy and n-octylcarbonyloxy; an aryloxycarbonyloxy (desirably a substituted or non-substituted $C_{7-30}$ aryloxycarbonyloxy group) such as phenoxycarbonyloxy, p-methoxyphenoxycarbonyloxy and p-n-hexadecyloxyphenoxycarbonyloxy; an amino group (desirably a non-substituted amino, a substituted or non-substituted $C_{1-30}$ alkyl amino group or a substituted or non-substituted $C_{6-30}$ anylino group) such as non-substituted amino, methylamino, dimethylamino, anilino, N-methyl-anilino and diphenylamino; an acylamino group (desirably formylamino, a substituted or non-substituted $C_{1-30}$ alkylacylamino or a substituted or non-substituted $C_{6-30}$ arylacylamino) such as formylamino, acetylamino, pivaloylamino, laurylamino and benzoylamino; an aminocarbonylamino group (desirably a substituted or non-substituted $C_{1-30}$ aminocarbonylamino group) such as non-substituted carbamoylamino, N,N-dimethylamino carbonylamino, N,N-diethylamino carbonylamino and morpholino carbonylamino; an alkoxy carbonylamino group (desirably a substituted or non-substituted $C_{2-30}$ alkoxy carbonylamino) such as methoxy carbonylamino, ethoxy carbonylamino, tert-butoxy carbonylamino, n-octadecyloxy carbonylamino and N-methyl-methoxy carbonylamino; an aryloxy carbonylamino group (desirably a substituted or non-substituted $C_{7-30}$ aryloxy carbonylamino group) such as phenoxy carbonylamino, p-chlorophenoxy carbonylamino and m-n-octyloxyphenoxy carbonylamino; a sulfamoyl amino group (desirably a substituted or non-substituted $C_{0-30}$ sulfamoyl amino group) such as non-substituted sulfamoyl amino, N,N-dimethylamino sulfamoyl amino and N-n-octylamino sulfamoyl amino; an alkyl and aryl sulfonylamino groups (desirably a substituted or non-substituted $C_{1-30}$ alkyl sulfonylamino group and a substituted or non-substituted $C_{6-30}$ aryl sulfonylamino group) such as methyl sulfonylamino, butyl sulfonylamino, phenyl sulfonylamino, 2,3,5-trichlorophenyl sulfonylamino and p-methylphenyl sulfonylamino; mercapto; an alkylthio group (desirably substituted or non-substituted $C_{1-30}$ alkylthio group) such as methylthio, ethylthio and n-hexadecylthio; an arylthio group (desirably a substituted or non-substituted $C_{6-30}$ arylthio group) such as phenylthio, p-chlorothio and m-methoxyphenylthio; a heterocyclic thio group (desirably a substituted or non-substituted $C_{2-30}$ heterocyclic thio group) such as 2-benzthiazoril and 1-phenyltetrazole-5-ylthio; a sulfamoyl group (desirably a substitute or non-substituted $C_{0-30}$ sulfamoyl group) such as N-ethylsulfamoyl, N-(3-dodecyloxypropyl)sulfamoyl, N,N-dimethylsulfamoyl, N-acetylsulfamoyl, N-benzolylsulfamoyl, and N-(N'-phenylcarbamoyl)sulfamoyl; sulfo; an alkyl and aryl sulfinyl groups (desirably a substituted or non-substituted $C_{1-30}$ alkyl sulfinyl group and a substituted or non-substituted $C_{6-30}$ aryl sulfinyl group) such as methylsulfinyl, ethylsulfinyl, phenylsulfinyl and p-methylphenyl sulfinyl; and alkyl and aryl sulfonyl groups (desirably a substituted or non-substituted $C_{1-30}$ alkyl sulfonyl group and a substituted or non-substituted $C_{6-30}$ aryl sulfonyl group) such as methyl sulfonyl, ethyl sulfonyl, phenyl sulfonyl and p-methylphenyl sulfonyl; an acyl group (desirably formyl, a substituted or non-substituted C2-30 alkyl carbonyl group, or a substituted or non-substituted $C_{7-30}$ aryl carbonyl group) such as acetyl and pivaloyl benzoyl; an aryloxycarbonyl group (desirably a substituted or non-substituted $C_{7-30}$ aryloxycarbonyl group) such as phenoxycarbonyl, o-chlorophenoxy carbonyl, m-nitrophenoxy carbonyl and p-tert-butylphenoxy carbonyl; an alkoxycarbonyl group (desirably a substituted or non-substituted $C_{2-30}$ alkoxycarbonyl group) such as methoxycarbonyl, ethoxycarbonyl, tert-butoxycarbonyl and n-octadecyloxy carbonyl; a carbamoyl group (desirably a substituted or non-substituted $C_{1-30}$ carbamoyl group) such as non-substituted carbamoyl, N-methylcarbamoyl, N,N-dimethylcarbamoyl, N,N-di-n-octylcarbamoyl, N-(methylsulfonyl)carbamoyl; an aryl and heterocyclic azo groups (desirably a substituted or non-substituted $C_{6-30}$ aryl azo group and a substituted or non-substituted $C_{3-30}$ heterocyclic azo group) such as phenyl azo, p-chlorophenyl azo and 5-ethylthio-1,3,4-thiazole-2-yl azo; an imido group such as N-succinimide and N-phtalimide; a phosphino group (desirably a substituted or non-substituted $C_{2-30}$ phosphino group) such as dimethyl phosphino, diphenyl phosphino and methylphenoxy phosphino; a phosphinyl group (desirably a substituted or non-substituted $C_{2-30}$ phosphinyl group) such as phosphinyl, dioctyloxy phosphinyl and diethoxy phosphinyl; a phosphinyloxy group (desirably a substituted or non-substituted $C_{2-30}$ phosphinyloxy group) such as diphenoxy phosphinyloxy and dioctyloxy phosphinyloxy; a phosphinylamino group (desirably a substituted or non-substituted $C_{2-30}$ phosphinylamino group) such as dimethoxy phosphinylamino and dimethylamino phosphinylamino; a silyl group (desirably a substituted or non-substituted $C_{3-30}$ silyl group) such as trimethylsilyl, tert-butylmethyl silyl and phenyldimethylsilyl.

Examples of the substituent include the above mentioned substituents having at least one substituent in the place of one or more hydrogen atoms therein. Examples of such a substituent include an alkyl carbonylamino sulfonyl, aryl carbonylamino sulfonyl, alkyl sulfonylamino carbonyl and aryl sulfonylamino carbonyl such as methyl sulfonylamino carbonyl, p-methylphenyl sulfonylamino carbonyl, acetylamino sulfonyl and benzoylamino sulfonyl.

Same or different two or more substituents may be selected. If possible, the substituents may bond to each other to form a ring.

Preferable examples of the compound represented by the formula (V-A) include the compounds in which $R^{11}$ is methyl, both of $R^2$ and $R^5$ are hydrogen atoms, $R^{13}$ is a C3 or longer alkyl group, $L^1$ is a single bond, —O—, —CO—, —NR—, —SO$_2$NR—, —NRSO$_2$—, —CONR—, —NRCO— (R is a hydrogen atom or a substituted or non-substituted alkyl or aryl group, and preferably a hydrogen atom), —COO—, —OCO— or an alkylene; $L^2$ is —O— or —NR— (R is a hydrogen atom or a substituted or non-substituted alkyl or aryl group, and preferably a hydrogen atom); $Ar^1$ is an arylene group, and n is an integer from 3 to 6.

Examples of the compound include, but are not limited to, those shown below.

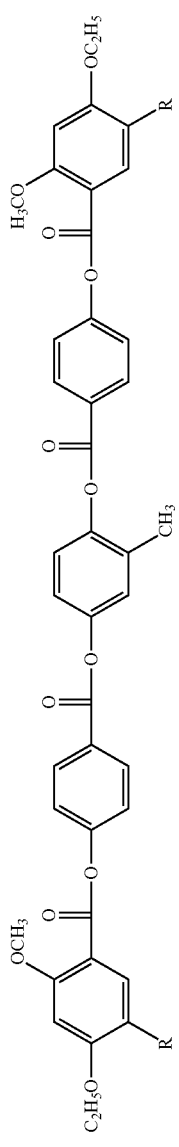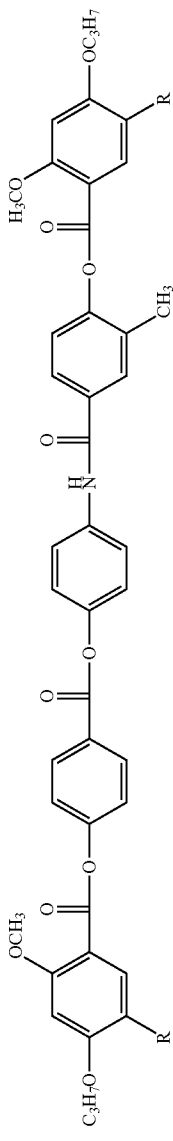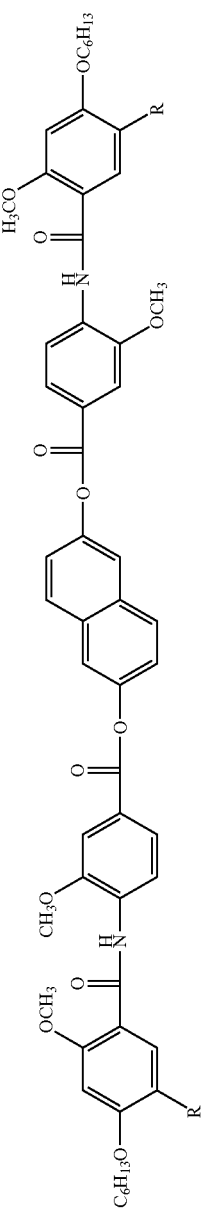

-continued
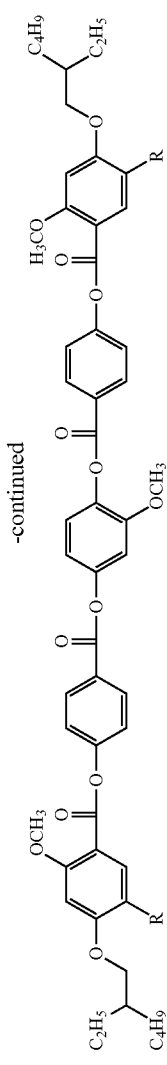
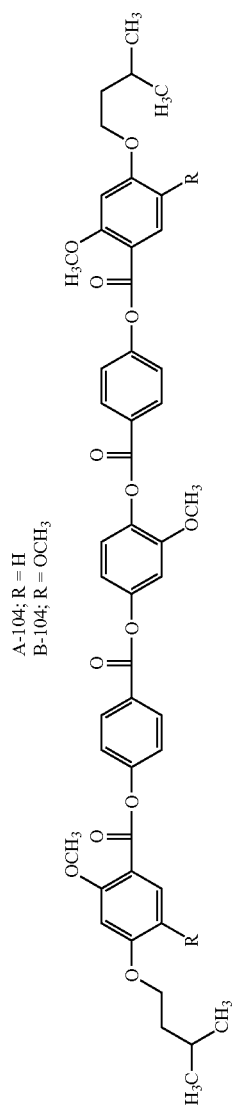
A-104; R = H
B-104; R = OCH₃
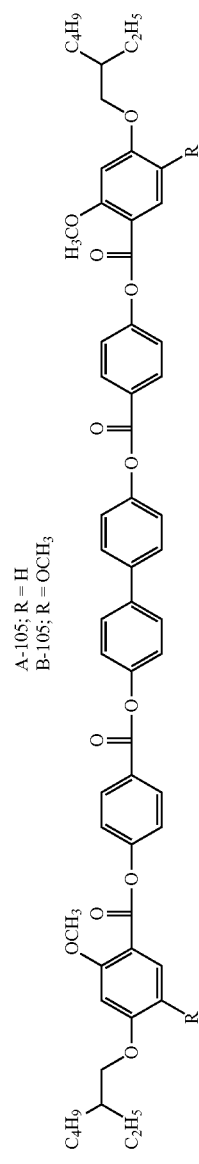
A-105; R = H
B-105; R = OCH₃
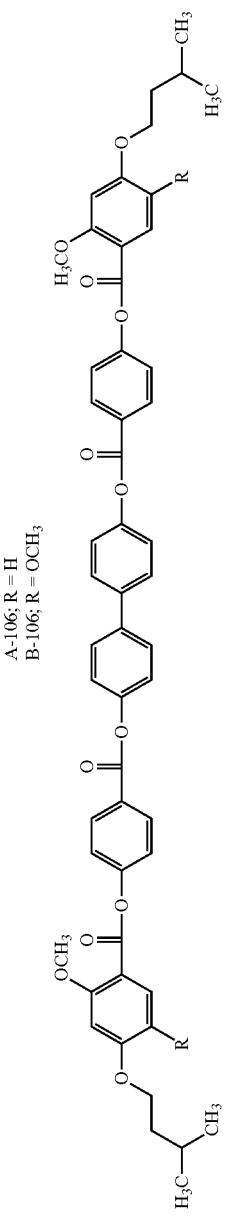
A-106; R = H
B-106; R = OCH₃
A-107; R = H
B-107; R = OCH₃

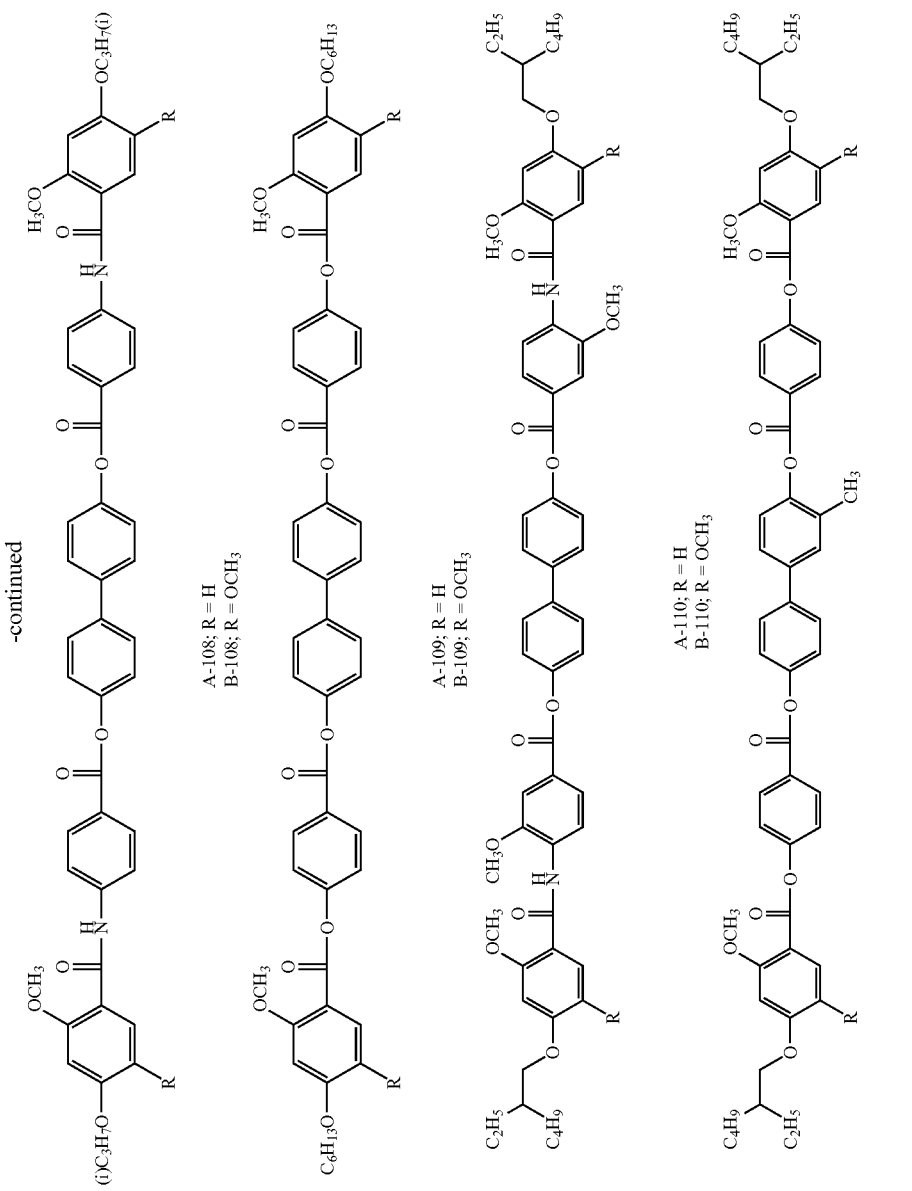

-continued
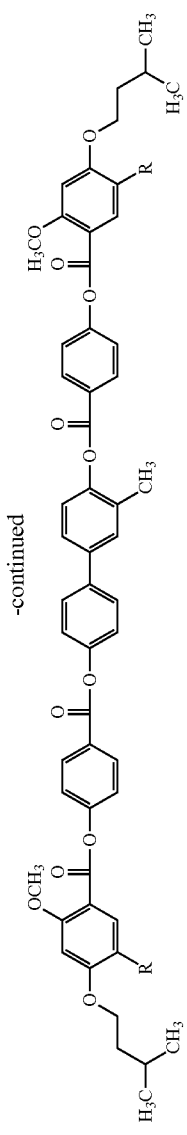
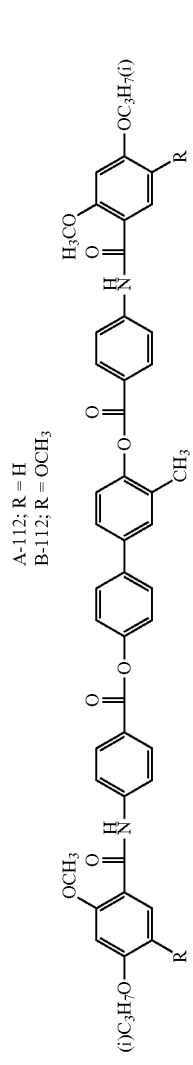
A-112; R = H
B-112; R = OCH₃
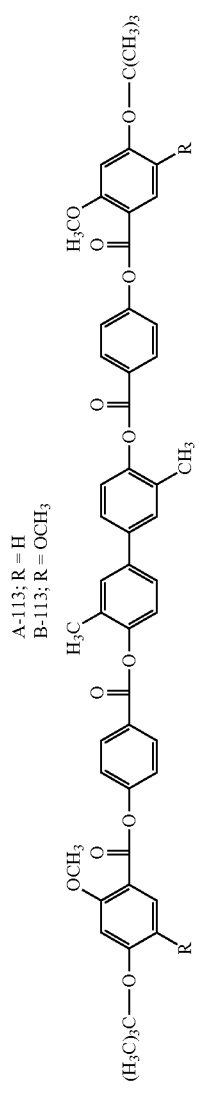
A-113; R = H
B-113; R = OCH₃
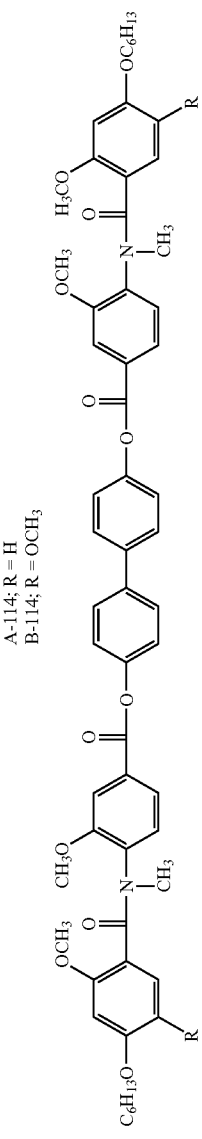
A-114; R = H
B-114; R = OCH₃
A-115; R = H
B-115; R = OCH₃

-continued
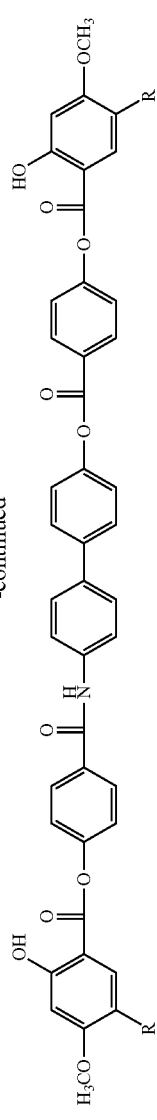
A-116; R = H
B-116; R = OCH₃
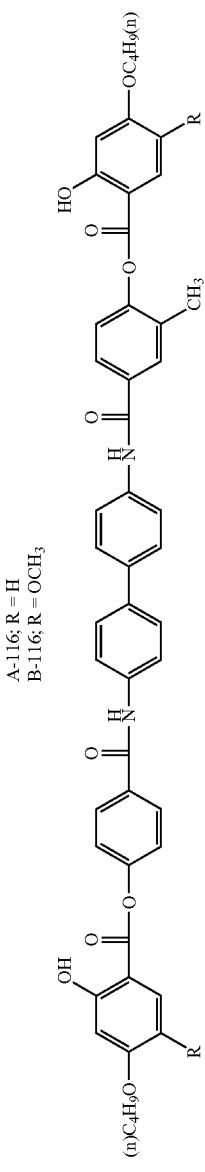
A-117; R = H
B-117; R = OCH₃
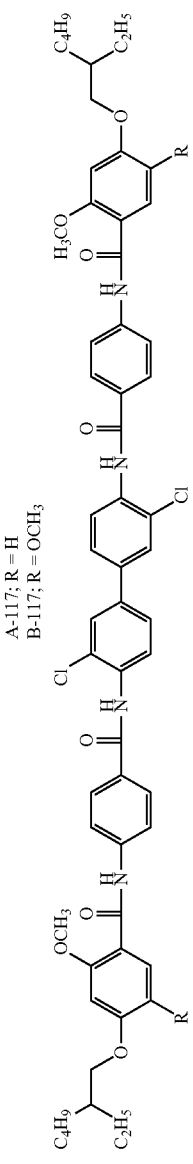
A-118; R = H
B-118; R = OCH₃
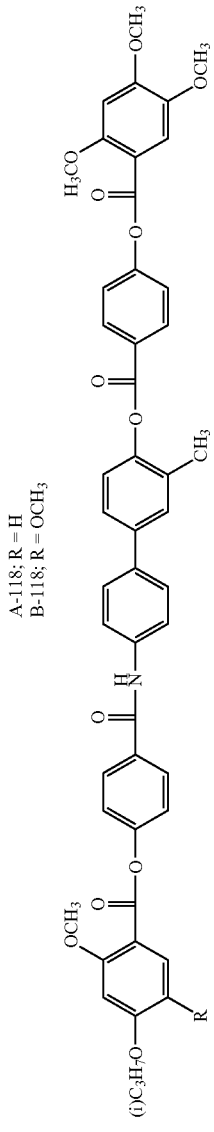
A-119; R = H
B-119; R = OCH₃

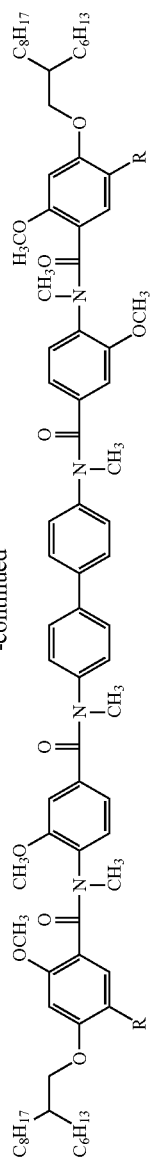
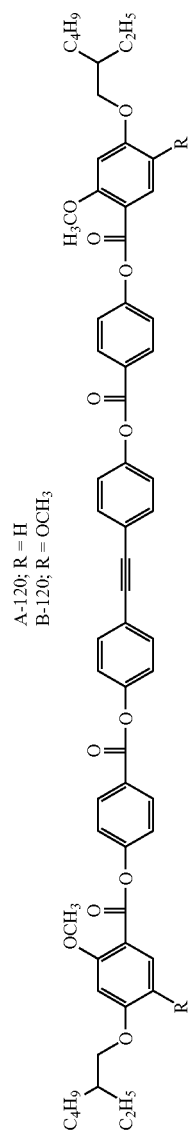
A-120; R = H
B-120; R = OCH$_3$
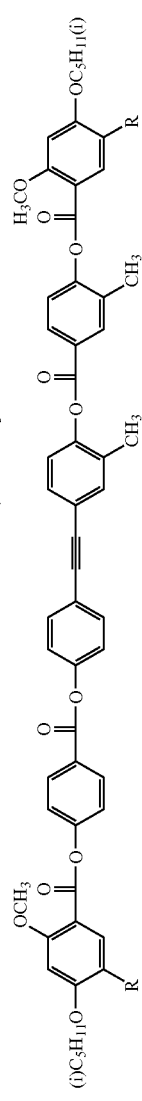
A-121; R = H
B-121; R = OCH$_3$
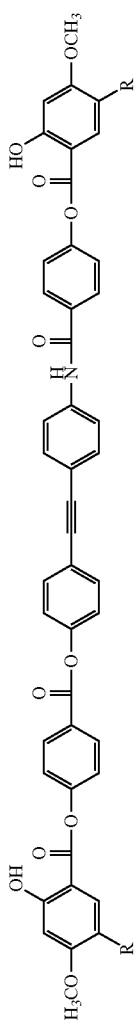
A-122; R = H
B-122; R = OCH$_3$
A-123; R = H
B-123; R = OCH$_3$ -continued
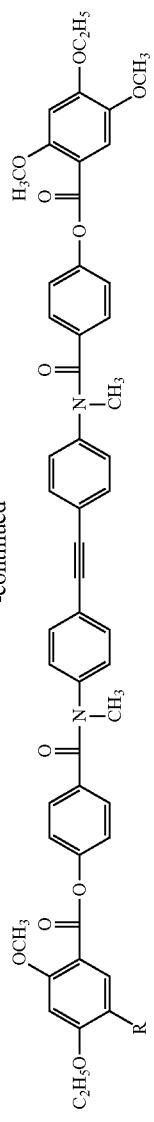
A-124; R = H
B-124; R = OCH₃
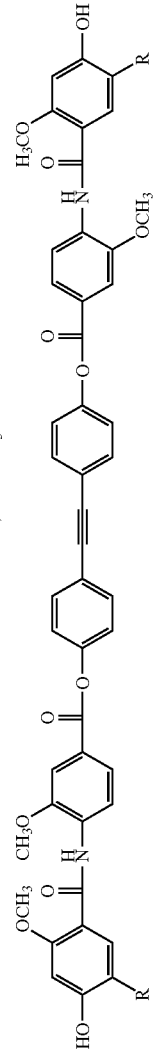
A-125; R = H
B-125; R = OCH₃
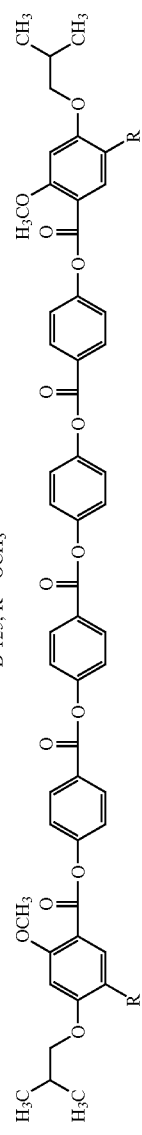
A-126; R = H
B-126; R = OCH₃
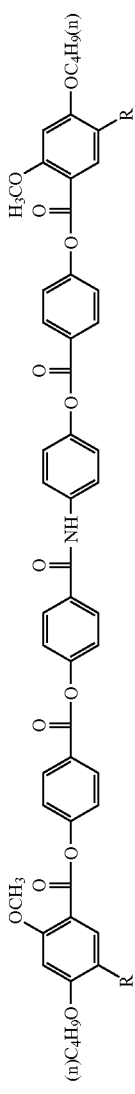
A-127; R = H
B-127; R = OCH₃

-continued
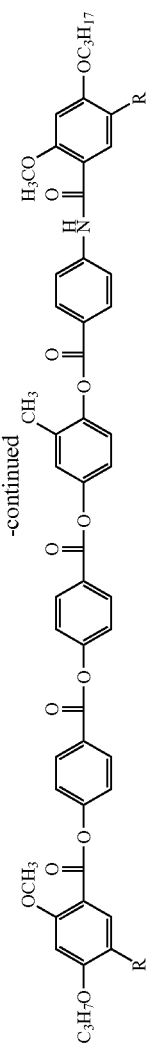
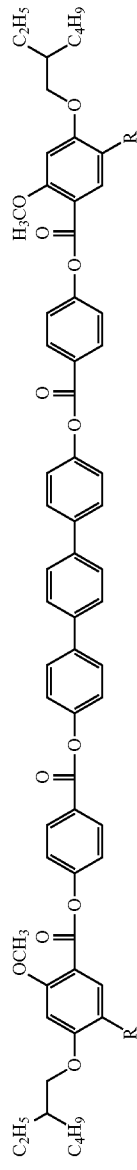
A-128; R = H
B-128; R = OCH₃
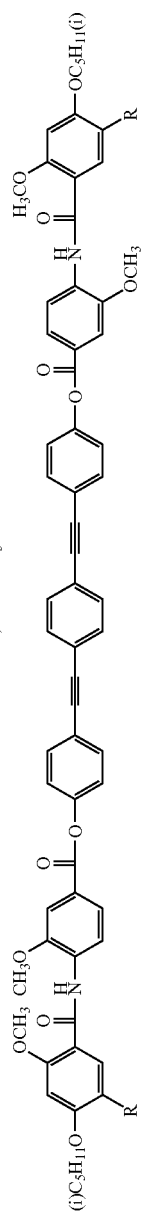
A-129; R = H
B-129; R = OCH₃
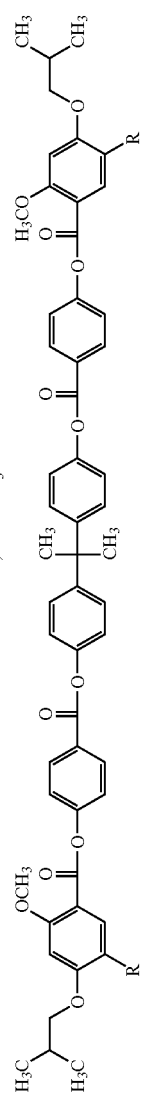
A-130; R = H
B-130; R = OCH₃
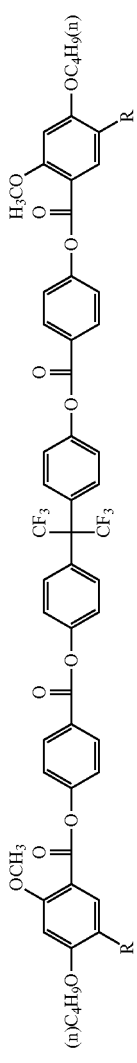
A-131; R = H
B-131; R = OCH₃
A-132; R = H
B-132; R = OCH₃

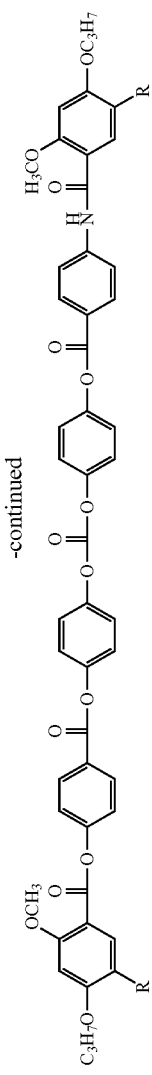
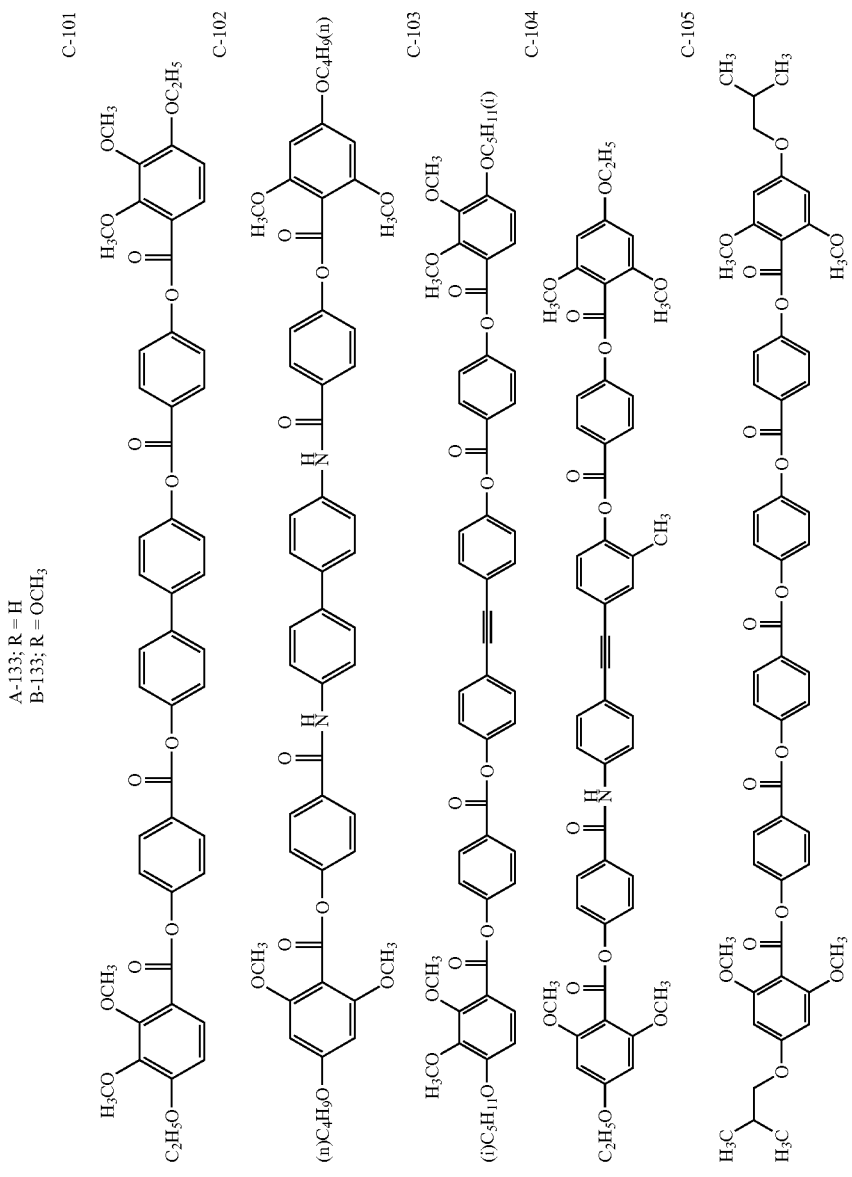

The compound represented by the formula (III) may be produced by a general esterification or a general amidation of a substituted benzoic acid, which may be synthesize previously, and a phenol derivative or an aniline derivative. The esterification or amidation may be carried out according to any method which can make an ester or amide bonding. For example, the compound may be produced as follows:

a substituted benzoic acid is converted into an acid halide, and, then, a condensation reaction of the acid halide and a phenol derivative or an aniline derivative is carried out; or a dehydration condensation of a substituted benzoic acid and a phenol derivative or an aniline derivative is carried out in the presence of a condensation agent or catalyst.

The former method is preferred in terms of the production process.

Reaction solvent, which can be employed in the process of producing the compound represented by the formula (III), is preferably selected from the group consisting of hydrocarbon base solvents such as toluene and xylene; ether base solvents such as dimethylether, tetrahydrofuran and dioxane; ketone base solvents; ester base solvents; acetonitrile, dimethyl formamide and dimethylacetamide. One solvent or two or more solvents may be employed. Among these, toluene, acetonitrile, dimethylformamide and dimethylacetamide are preferred.

The reaction temperature is preferably set within the range from 0 to 150° C., more preferably from 0 to 100° C., much more preferably from 0 to 90° C., and especially preferably from 20 to 90° C.

The reaction may be carried out with base or without base, the latter is preferred. Examples of the base include organic bases and inorganic bases, and organic bases such as pyridine and tertiary alkyl amine (e.g. triethyl amine and ethyl diisopropyl amine) are preferred.

The compound represented by the formula (V-A) or (V-B) can be produced according to any usual method. The compounds in which "n" is 4 may be produced as follows:

a reaction of a starting material having a following structure "A" with a derivative having a reactive site such as hydroxyl and amino is carried out to generate an intermediate B-2 shown below; a reaction of the intermediate B-2 with a compound "C" shown below to connect two molecules of the intermediate B-2 with a molecule of the compound "C" shown below; and then a compound represented by the formula (V-A) or (V-B) can be obtained.

The method to be employed for producing the compound is not limited to the above mentioned method.

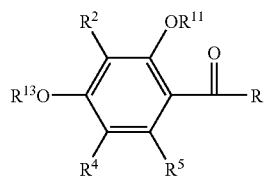

A

In the structure "A", R represents a reactive group such as hydroxyl and a halogen atom; $R^{11}$, $R^2$, $R^{13}$ and $R^5$ are same as described above; and $R^4$ represents a hydrogen atom or the above mentioned $OR^{14}$.

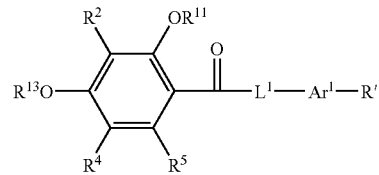

B

In the formula, R' represents a reactive group such as carboxyl; $R^{11}$, $R^2$, $R^{13}$, $R^{14}$, $R^{15}$, $Ar^1$ and $L^1$ are same as described above.

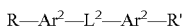

C

In the formula, R and R' represents a reactive group such as hydroxyl and amino; $Ar^2$ and $L^2$ are defined as $Ar^1$ and $L^1$ are defined above.

The amount of the Rth enhancer is preferably from 0.1 to 30 mass %, more preferably from 1 to 20 mass % and much more preferably from 3 to 15 mass % with respect to the total mass of cellulose acylate.

The cellulose acylate film may be produced according to a solvent-casting method, and in such a case, the Rth enhancer may be added to a cellulose acylate solution (dope). The timing of adding the Rth enhancer to the dope is not specifically defined. For example, the Rth enhancer may be dissolved in an organic solvent such as alcohol, methylene chloride, dioxolane, and then it may be added to the dope; or the Rth enhancer may be directly added to the dope.

The cellulose acylate film, especially the film to be used as the first-optically anisotropic layer, may contain a UV absorbent. The UV absorbent may function also as an Rth enhancer and/or an agent for controlling wavelength dispersion characteristic of Re. The UV absorbent includes, for example, oxybenzophenone compounds, benzotriazole compounds, salicylate compounds, benzophenone compounds, cyanoacrylate compounds, and nickel complex compounds; and preferred are benzotriazole compounds causing little coloration. In addition, UV absorbents described in Japanese Laid-Open Patent Publication Nos. 10-182621 and 8-337574, and UV absorbent polymers described in Japanese Laid-Open Patent Publication No. 6-148430 are also preferably used herein. For the UV absorbent for the cellulose acylate film, preferred are those having an excellent ability to absorb UV rays having a wavelength of at most 370 nm, in terms of preventing degradation of polarizing elements and liquid crystals, and those not almost absorbing visible light having a wavelength of at least 400 nm in terms of the image display capability.

Examples of the benzotriazole-type UV absorbent usable in the invention are 2-(2'-hydroxy-5'-methylphenyl)benzotriazole, 2-(2'-hydroxy-3',5'-di-tert-butylphenyl)benzotriazole, 2-(2'-hydroxy-3'-tert-butyl-5'-methylphenyl)benzotriazole, 2-(2'-hydroxy-3',5'-di-tert-butylphenyl)-5-chlorobenzotriazole, 2-(2'-hydroxy-3'-(3'',4'',5'',6''-tetrahydrophthalimidomethyl)-5'-methylphenyl)benzotriazole, 2,2-methylenebis(4-(1,1,3,3-tetramethylbutyl)-6-(2H-benzotriazol-2-yl)phenol, 2-(2'-hydroxy-3'-tert-butyl-5'-methylphenyl)-5-chlorobenzotriazole, 2-(2H-benzotriazol-2-yl)-6-(linear or branched dodecyl)-4-methylphenol, a mixture of octyl-3-[3-tert-butyl-4-hydroxy-5-(chloro-2H-benzotriazol-2-yl)phenyl]propionate and 2-ethylhexyl-3-[3-tert-butyl-4-hydroxy-5-(5-chloro-2H-benzotriazol-2-yl)phenyl]propionate, to which, however, the invention should not be limited. In addition, commercial products of TINUVIN 109, TINUVIN 171, TINUVIN 326 (all by Ciba Specialty Chemicals) are also preferably usable herein.

For producing the cellulose acylate film satisfying the condition for the first optically anisotropic layer, a plasticizer such as triphenyl phosphate or biphenyl phosphate may be added to the cellulose acylate film.

The liquid crystal display device of the invention may be in any mode of a vertical alignment mode (VA mode) or a horizontal alignment mode such as ISP mode, or OCB mode, TN mode, etc.

EXAMPLES

Paragraphs below will further specifically explain the present invention referring to Examples and Comparative Examples, without limiting the present invention. The lubricant compositions in Examples and Comparative Examples were evaluated according to the methods described below.

[Fabrication of Retardation Film for First Optically anisotropic Layer]

(Preparation of Cellulose Acylate Solution CA-1)

The following composition was put into a mixing tank, and stirred to dissolve the components, thereby preparing a cellulose acylate solution CA-1.

| (Composition of Cellulose Acylate Solution CA-1) | |
|---|---|
| Cellulose Acetate (degree of Ac substitution 2.92) | 100.0 mas.pts. |
| Rth Depressor 119 mentioned below | 12.0 mas.pts. |
| Methylene Chloride (first solvent) | 402.0 mas.pts. |
| Methanol (second solvent) | 60.0 mas.pts. |

Rth Depressor 119

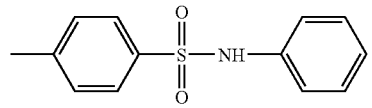

(Preparation of Mat Agent Solution Mt-1)

20 parts by mass of silica particles having a mean particle size of 16 nm (AEROSIL R972, by Nippon Aerosil) and 80 parts by mass of methanol were well stirred and mixed for 30 minutes to prepare a silica particle dispersion. The dispersion was put into a disperser along with the following composition, and further stirred for 30 minutes or more to dissolve the components, thereby preparing a mat agent solution MT-1.

| (Composition of Mat Agent Solution MT-1) | |
|---|---|
| Dispersion of Silica Particles having a mean particle size of 16 nm | 10.0 mas. pts. |
| Methylene Chloride (first solvent) | 76.3 mas. pts. |
| Methanol (second solvent) | 3.4 mas. pts. |
| Cellulose Acylate Solution CA-1 | 10.3 mas. pts. |

(Preparation of Additive Solution)

The following composition was put into a mixing tank, and stirred under heat to dissolve the components, thereby preparing an additive solution AD-1.

| (Composition of Additive Solution AD-1) | |
|---|---|
| Wavelength Dispersion-Controlling Agent UV-265 mentioned below | 18.1 mas.pts. |
| Methylene Chloride (first solvent) | 58.4 mas.pts. |
| Methanol (second solvent) | 8.7 mas.pts. |
| Cellulose Acylate Solution CA-1 | 12.8 mas.pts. |

Wavelength Dispersion-Controlling Agent UV-265

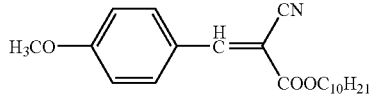

(Fabrication of Retardation Film Sample 101)

94.0 parts by mass of the above cellulose acylate solution CA-1, 1.5 parts by mass of the mat agent solution MT-1, and 4.5 parts by mass of the additive solution AD-1 were mixed, after separately filtered, and then cast using a band caster. In the above compositions, the ratio by mass of the Rth depressor and the wavelength dispersion-controlling agent to the cellulose acylate was 12.0% and 5.0%, respectively. The film having a residual solvent content of 30% was peeled away from the band, and dried at 135° C. for 20 minutes, thereby producing a cellulose acylate film. The cast film was stretched along the transversal direction at a stretching draw ratio of 5%, using a tenter under a condition of 160° C., thereby obtaining a retardation film 101 having a thickness of 80 μm.

The film was conditioned at 25° C. and 60% RH for 2 hours or more; and then, using an automatic birefringence meter KOBRA-21ADH (by Oji Scientific Instruments), this was conditioned at 25° C. and 60% RH for 2 hours or more, and analyzed for its three-dimensional birefringence at a wavelength of 450 nm, 550 nm and 650 nm, thereby obtaining the in-plane retardation Re thereof and the thickness-direction retardation Rth through measurement of Re at different tilt angles. Thus analyzed, the sample had the optical characteristics shown in Table 1.

(Fabrication of Retardation Film Sample 102)

A retardation film sample 102 having a thickness of 80 μm and having the optical characteristics shown in Table 1 was obtained in the same manner as that for the retardation film sample 101, for which, however, 7.0 parts by mass of triphenyl phosphate and 5.0 parts by mass of biphenyl phosphate were added in place of the Rth depressor 119 in the cellulose acylate solution CA-1, and the amount of the wavelength dispersion-controlling agent UV-265 in the additive solution AD-1 was changed to 10.5 parts by mass, or in other words the amount of the wavelength dispersion-controlling agent UV-265 in the cellulose acylate solution was changed to 3.0% with respect to the total mass of cellulose acylate.

(Fabrication of Retardation Film Sample 103)

A film was prepared according to the same casting method as that for the retardation film sample 101, for which, however, the amount of the wavelength dispersion-controlling agent UV-265 in the additive solution AD-1 was changed to 21.5 parts by mass, or in other words the amount of the wavelength dispersion-controlling agent UV-265 in the cellulose acylate solution was changed to 6.0% with respect to the total mass of cellulose acylate. In the place of carrying out stretching along the transversal direction, the film was conveyed for 3 minutes while the film was clipped with tenter clips and the film temperature was kept at 180° C., thereby obtaining a retardation film sample 103 having a thickness of 87 μm and having the optical characteristics shown in Table 1.

(Fabrication of Retardation Film Sample 104)

A film was prepared according to the same casting method as that for the retardation film sample 101, for which, however, the cellulose acylate in the cellulose acylate solution CA-1 was changed to a cellulose acylate having a degree of substitution of 2.86, 7.0 parts by mass of triphenyl phosphate and 5.0 parts by mass of biphenyl phosphate were added in place of the Rth depressor 119, and the amount of the wavelength dispersion-controlling agent UV-265 in the additive solution AD-1 was changed to 1.8 parts by mass, or in other words the amount of the wavelength dispersion-controlling agent UV-265 in the cellulose acylate solution was changed to 0.5% with respect to the total mass of cellulose acylate. In the place of carrying out stretching along the transversal direction, the film was conveyed for 3 minutes while the film was clipped with tenter clips and the film temperature was kept at 180° C., thereby obtaining a retardation film sample 104 having a thickness of 87 μm and having the optical characteristics shown in Table 1.

(Fabrication of Retardation Film Sample 105)

A retardation film sample 105 having a thickness of 85 μm and having the optical characteristics shown in Table 1 was obtained in the same manner as that for the retardation film sample 101, for which, however, the amount of the wavelength dispersion-controlling agent UV-265 in the additive solution AD-1 was changed to 21.5 parts by mass. Any stretching step was not carried out.

TABLE 1

| | | RETARDATION FILM SAMPLE NO. | | | | |
|---|---|---|---|---|---|---|
| | | 101 | 102 | 103 | 104 | 105 |
| Re (nm) | 450 | 18 | 15 | −19 | −14 | 13 |
| | 550 | 0.8 | 0.7 | −0.9 | 0 | 9 |
| | 650 | −15 | −12 | 15 | 13 | 6 |
| Rth (nm) | 450 | 77 | 39 | 79 | 35 | 69 |
| | 550 | 56 | 58 | 61 | 50 | 53 |
| | 650 | 34 | 78 | 28 | 67 | 47 |

(Fabrication of Polarizer)

The surface of retardation film 101 fabricated in the above was processed for alkali saponification as follows: This was dipped in an aqueous 1.5 N sodium hydroxide solution at 55° C. for 2 minutes, then washed in a water bath at room temperature, and then neutralized with 0.1 N sulfuric acid at 30° C. Again this was washed in a water bath at room temperature, and then dried with hot air at 100° C. Next, a polyvinyl alcohol film fill having a thickness of 80 μm was continuously stretched in an aqueous iodine solution by 5 times, and dried to prepare a polarizing film having a thickness of 20 μm. The above alkali-saponified retardation film sample 101 and Fujitac TD80UL (by Fuji Photo Film) alkali-saponified in the same manner were prepared; and using an aqueous 3% polyvinyl alcohol (Kuraray's PVA-117H) solution, these were stuck together with the polarizing film in such a manner that their saponified surfaces could be on the side of the polarizing film, thereby obtaining a polarizer 101 in which the retardation film 101 and TD80UL are protective films for the polarizing film. In this, the films were so stuck together that the MD direction of the retardation film sample 101 and the slow axis of TD80UL could be parallel to the absorption axis of the polarizing film.

Similarly, using the retardation film samples 102 to 104 and the comparative retardation film sample 105 fabricated in the above, polarizers were fabricated. These are hereinafter referred to as Polarizers 102 to 104 and 105. These polarizers all exhibited sufficient polarizing capability.

[Fabrication of Retardation Film for Second Optically Anisotropic Layer]

(Fabrication of Retardation Film Sample 201)

(Preparation of Cellulose Acylate Solution CA-2)

| (Composition of Cellulose Acylate Solution CA-2) | |
|---|---|
| Cellulose Acetate having a degree of Ac substitution of 2.81 | 100.0 mas. pts. |
| TPP (triphenyl phosphate) | 7.8 mas. pts. |
| BDP (biphenyldiphenyl phosphate) | 3.9 mas. pts. |
| Methylene Chloride (first solvent) | 402.0 mas. pts. |
| Methanol (second solvent) | 60.0 mas. pts. |

(Preparation of Mat Agent Solution Mt-2)

20 parts by mass of silica particles having a mean particle size of 16 nm (AEROSIL R972, by Nippon Aerosil) and 80 parts by mass of methanol were well stirred and mixed for 30 minutes to prepare a silica particle dispersion. The dispersion was put into a disperser along with the following composition, and further stirred for 30 minutes or more to dissolve the components, thereby preparing a mat agent solution MT-2.

| (Composition of Mat Agent Solution MT-2) | |
|---|---|
| Dispersion of Silica Particles having a mean particle size of 16 nm | 10.0 mas. pts. |
| Methylene Chloride (first solvent) | 76.3 mas. pts. |
| Methanol (second solvent) | 3.4 mas. pts. |
| Cellulose Acylate Solution CA-2 | 10.3 mas. pts. |

(Preparation of Additive Solution)

The following composition was put into a mixing tank, and stirred under heat to dissolve the components, thereby preparing an additive solution AD-2.

| (Composition of Additive Solution AD-2) | |
|---|---|
| Retardation-Expressing Agent X mentioned below | 21.7 mas.pts. |
| Methylene Chloride (first solvent) | 58.4 mas.pts. |
| Methanol (second solvent) | 8.7 mas.pts. |
| Cellulose Acylate Solution CA-2 | 12.8 mas.pts. |

Retardation-Expressing Agent X

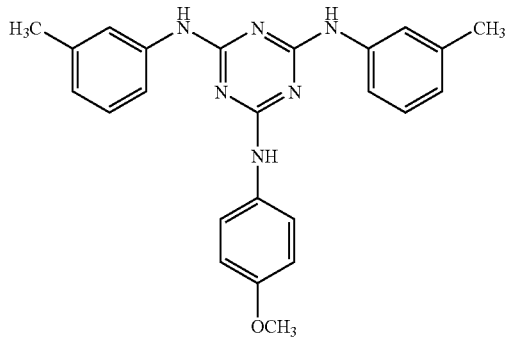

(Fabrication of Cellulose Acylate Film Sample 01)

94.0 parts by mass of the above cellulose acylate solution CA-2, 1.5 parts by mass of the mat agent solution MT-2, and 4.5 parts by weight of the additive solution AD-2 were mixed, after separately filtered, and then cast using a band caster. In the above compositions, the ratio by mass of the retardation-expressing agent to the cellulose acylate was 6.0%. The film having a residual solvent content of 30% was peeled away from the band, and dried at 140° C. for 40 minutes, thereby producing a cellulose acylate film sample 01. Thus produced, the cellulose acylate film sample 01 had a residual solvent content of 0.2% and a thickness of 120 μm.

(Fabrication of Retardation Film Sample 201)

Thus obtained in the above, the cellulose acylate film sample 01 was led into a stretcher having a step of stretching a continuous long film along the transversal direction thereof by the use of a tenter, which is so constituted that the distance between the tenter clips in the machine direction of the film becomes narrower while the film is held and conveyed in the device, and the film was stretched by 1.25 times along the transversal direction while the film temperature was kept at 160° C., thereby giving a stretched retardation film sample 201 having a thickness of 104 μm. The optical characteristics of the retardation film sample 201 are shown in Table 2 below.

(Fabrication of Retardation Film Sample 202)

The cellulose acylate film sample 01 obtained in the above was kept at 180° C. for 30 seconds and led to pass through a heating zone, and then stretched by 1.35 times along the transversal direction while shrunk in the machine direction by 0.65 times, thereby giving a stretched retardation film sample 202 having a thickness of 140 μm. The optical characteristics of the retardation film sample 202 are shown in Table 2 below.

(Fabrication of Retardation Film Sample 203)

A cellulose acylate film sample 03 was fabricated in the same manner as that for the cellulose acylate film sample 01, for which, however, the cellulose acetate having a degree of Ac substitution of 2.81 in the composition of the cellulose acylate solution CA-2 was changed to a cellulose acetate having a degree of Ac substitution of 2.92 and the amount of the retardation-expressing agent X in the composition of the additive solution AD-2 was changed to 10.0 parts by mass. Thus obtained, the film was kept at 180° C. for 30 seconds and led to pass through a heating zone, and then stretched by 1.25 times along the transversal direction while shrunk in the machine direction by 0.75 times, thereby giving a stretched retardation film sample 203 having a thickness of 135 μm. The optical characteristics of the retardation film sample 203 are shown in Table 2 below.

(Fabrication of Retardation Film Sample 204')

A cellulose acylate film sample 04 was fabricated in the same manner as that for the cellulose acylate film sample 01, for which, however, the cellulose acetate having a degree of Ac substitution of 2.81 in the composition of the cellulose acylate solution CA-2 was changed to a cellulose acetate having a degree of Ac substitution of 2.86 and the retardation-expressing agent X was not added to the composition of the additive solution AD-2. Thus obtained, the film was stretched by 1.3 times in the machine direction at 200° C., while shrunk by 0.7 times along the transversal direction, thereby giving a stretched retardation film sample 204' having a thickness of 125 μm. The optical characteristics of the retardation film sample 204' are shown in Table 2 below.

(Fabrication of Retardation Film Sample 204")

A cellulose acylate film sample 05 was fabricated in the same manner as that for the cellulose acylate film sample 01, for which, however, the cellulose acetate having a degree of Ac substitution of 2.81 in the composition of the cellulose acylate solution CA-2 was changed to a cellulose acetate having a degree of Ac substitution of 2.92 and 21.7 parts by mass of the retardation-expressing agent X in the composition of the additive solution AD-2 was changed to 25.0 parts by mass of a wavelength dispersion-controlling agent UV-265. Thus obtained, the film was kept at 160° C. and biaxially stretched by 1.1 times along the transversal direction and by 1.1 times in the machine direction, thereby giving a stretched retardation film sample 204" having a thickness of 100 μm. The optical characteristics of the retardation film sample 204" are shown in Table 2 below.

(Fabrication of Retardation Film Sample 204)

The retardation film samples 204' and 204" were laminated to fabricate a retardation film sample 204.

TABLE 2

| | RETARDATION FILM SAMPLE NO. | | | | |
|---|---|---|---|---|---|
| | | | | 204 | |
| | 201 | 202 | 203 | 204' | 204" |
| Re (nm) 450 | 450 | 59 | 44 | 35 | 40 | 2 |
| 550 | 57 | 55 | 50 | 60 | 1 |
| 650 | 56 | 69 | 71 | 80 | 1 |
| Rth (nm) 450 | 205 | 240 | 199 | 10 | 217 |
| 550 | 202 | 205 | 202 | 13 | 158 |
| 650 | 199 | 166 | 205 | 15 | 124 |

(Fabrication of Polarizer)

In the same manner as in the above, a polarizing film was fabricated. Using a polyvinyl alcohol adhesive, a surface-saponified retardation film sample 201 was stuck to one surface of the polarizing film, and a surface-saponified cellulose triacetate film (Fujitac TD80UL, by Fuji Photo Film) was stuck to the other surface thereof, thereby constructing a polarizer 201.

Using the above-prepared retardation film samples 202 to 204, polarizers were fabricated in the same manner as above, and these are polarizers 202 to 204. These polarizers all exhibited sufficient polarizing capability.

Example 1

Construction of Liquid Crystal Display Device

Depending on the optical characteristics of the optically-compensatory film to be used in liquid crystal display devices, the film samples were actually mounted on a VA panel according to the following four groups A to D, and evaluated for their properties.

(Liquid Crystal Display Devices 001 and 005)

In a VA-mode liquid crystal TV (C37-GE2, by Sharp), the polarizer and the retardation plate on both the top and the back of the panel were peeled away, and the liquid crystal cell was thus taken out of the device and used herein. Like the constitution of FIG. 1, the polarizer 101 was used as the polarizing element 11 and the first optically anisotropic layer 14; the above VA liquid crystal cell was used as the liquid crystal cell 13; and the polarizer 201 was used as the polarizing element 12 and the second optically anisotropic layer 15; and these were laminated with an adhesive. In this, these were so laminated that the retardation film sample 201 of the polarizer 201 was made to be on the side of the liquid crystal cell 13; and the retardation film sample 101 of the polarizer 101 was made to be on the side of the liquid crystal cell 13. In addition, they are so laminated that the slow axis of the retardation film sample 201 could be perpendicular to the absorption axis of the polarizer 201. In that manner, a liquid crystal display device 001 was constructed. The liquid crystal display device 001 belongs to the above-mentioned group A.

A liquid crystal display device 005 was constructed in the same manner as that for the liquid crystal display device 001, for which, however, the polarizer 105 was used in place of the polarizer 101.

(Liquid Crystal Display Device 002 and 006)

Like the constitution of the above-mentioned liquid crystal display device 001 (group A), but using a polarizer 102 and 105 in place of the polarizer 101 and using a polarizer 202 in place of the polarizer 201, liquid crystal display devices 002 and 006 were constructed. Of those, the liquid crystal display device 002 belongs to the above-mentioned group B.

(Liquid Crystal Display Device 003 and 007)

Like the constitution of the above-mentioned liquid crystal display device 001 (group A), but using a polarizer 103 and 105 in place of the polarizer 101 and using a polarizer 203 in place of the polarizer 201, liquid crystal display devices 003 and 007 were constructed. Of those, the liquid crystal display device 003 belongs to the above-mentioned group C.

(Liquid Crystal Display Device 004 and 008)

Like the constitution of the above-mentioned liquid crystal display device 001 (group A), but using a polarizer 104 and 105 in place of the polarizer 101 and using a polarizer 204 in place of the polarizer 201, liquid crystal display devices 004 and 008 were constructed. Of those, the liquid crystal display device 004 belongs to the above-mentioned group D.

(Evaluation of Panel Coloration and Viewing Angle)

In the VA-mode liquid crystal display devices 001 to 008 constructed in the above, a backlight was set on the side of the polarizing element 2 in FIG. 1 (or that is, on the side of the polarizer 201 to 204); and the devices were tested for the brightness and the color at the time of black level and white level of display, in a dark room using a contrast tester (EZ-Contrast XL88, by ELDIM), and the color shift and the contrast ratio at the time of black level were computed.

(Black Color Shift in Polar Angle Direction)

At the time of black level of display, the viewing angle is tilted from the normal direction of the liquid crystal cell toward the center line direction of the transmission axis of the pair of polarizers (azimuth angle of 45 degrees), and in that condition, it is desirable that the color change $\Delta x\theta$ and $\Delta y\theta$ always satisfy the following numerical formulae (II) and (III) within a polar angle of from 0 to 80 degrees:

$$0 \leq \Delta x\theta \leq 0.1, \quad (II)$$

$$0 \leq \Delta y\theta \leq 0.1, \quad (III)$$

[in the formulae, $\Delta x\theta = x\theta - x\theta 0$, $\Delta y\theta = y\theta - y\theta 0$; $(x\theta 0, y\theta 0)$ is the chromaticity as measured in the normal direction of the liquid crystal cell at the time of black level of display; $(x\theta, y\theta)$ is the chromaticity as measured in the direction in which the viewing angle is tilted from the normal direction of the liquid crystal cell toward the center line direction of the transmission axis of the pair of polarizers at the time of black level of display].

(Black Color Shift in Azimuth Angle Direction)

When the viewing angle is turned down by 60 degrees from the normal direction of the liquid crystal cell toward the absorption axis direction of the polarizer on the viewing side and when the device is tested for the chromaticity as rotated by 360 degrees around the normal line as the center starting from on the above-mentioned direction as the base point, it is also desirable that the color change $\Delta x\phi$ and $\Delta y\phi$ always satisfy the following formulae (IV) and (V) within the azimuth angle range of from 0 degree to 360 degrees:

$$-0.02 \leq \Delta x\phi \leq 0.1, \quad (IV)$$

$$-0.02 \leq \Delta y\phi \leq 0.1, \quad (V)$$

[in the formulae, $\Delta x\phi = x\phi - x\phi 0$, $\Delta y\phi = y\phi - y\phi 0$; $(x\phi 0, y\phi 0)$ is the chromaticity as measured by tilting the viewing angle by 60 degrees from the normal direction of the liquid crystal cell toward the absorption axis direction of the polarizer on the viewing side at the time of black level of display; $(x\phi, y\phi)$ is the chromaticity as measured in the direction of an azimuth angle $\phi$ around the normal direction as the center, by tilting the viewing angle by 60 degrees from the normal direction of the liquid crystal cell toward the absorption axis direction of the polarizer on the viewing side at the time of black level of display].

(Viewing Angle)

When a contrast ratio at an azimuth angle of 45 degrees and a polar angle of 60 degree (CR@$\phi$=45/$\Theta$=60) is larger, it means that the viewing angle is larger.

The results are shown in Table 3 below.

TABLE 3

| | Liquid crystal Display Device No. | | | | | | | |
|---|---|---|---|---|---|---|---|---|
| | 001 | 002 | 003 | 004 | 005 | 006 | 007 | 008 |
| | Polarizer No. on panel side | | | | | | | |
| | 101 | 102 | 103 | 104 | 105 | 105 | 105 | 105 |
| | Polarizer No. on backlight side | | | | | | | |
| | 201 | 202 | 203 | 204 | 201 | 202 | 203 | 204 |
| Group | A | B | C | D | — | — | — | — |
| CR: $\phi$ = 45/$\theta$ = 60 | 57 | 53 | 51 | 54 | 53 | 32 | 37 | 28 |
| $\Delta x\theta$ | 0.01 | 0.03 | 0.02 | 0.02 | 0.07 | 0.18 | 0.21 | 0.18 |
| $\Delta y\theta$ | 0.01 | 0.02 | 0.01 | 0.02 | 0.14 | 0.17 | 0.21 | 0.15 |
| $\Delta x\phi$ | 0.01 | 0.02 | 0.01 | 0.02 | 0.13 | 0.23 | 0.19 | 0.17 |
| $\Delta y\phi$ | 0.01 | 0.01 | 0.01 | 0.01 | 0.08 | 0.15 | 0.14 | 0.12 |

What is claimed is:

1. A liquid crystal display device comprising:
   a first polarizing element and a second polarizing element which are disposed with their transmission axes perpendicular to each other,
   a liquid crystal layer disposed between the first and the second polarizing elements, and
   a first optically anisotropic layer disposed between the first or the second polarizing element and the liquid crystal layer, showing a positive in-plane retardation (Re) at $\lambda 1$ and a negative Re at $\lambda 2$, both of $\lambda 1$ and $\lambda 2$ ($\lambda 1 \neq \lambda 2$) are within a visible wavelength range, and its absolute value of a thickness-direction retardation at 550 nm, |Rth(550)|, is equal to or more than 50 nm,
   wherein the first optically anisotropic aver satisfies relations (1) and (2):

$$Re(450) \times Re(650) < 0 \qquad (1)$$

$$|Rth(550)/Re(550)| > 10 \qquad (2)$$

wherein Re($\lambda$) means an in-plane retardation (unit; nm) measured applying light having a wavelength of $\lambda$ nm to the layer, and the positivity and the negativity of Re is decided with reference to an absorption axis of the first and second polarizing element which is disposed nearer to the layer than another, and the direction parallel to the absorption direction is a positive direction.

2. The liquid crystal display device of claim 1, comprising a second optically anisotropic layer disposed between the first or the second polarizing element and the liquid crystal layer, wherein the second optically anisotropic layer satisfies relations (3) and (4):

$$30 \text{ nm} < Re(550) < 400 \text{ nm} \qquad (3)$$

$$-100 \text{ nm} < Rth(550) < 300 \text{ nm} \qquad (4)$$

wherein Re($\lambda$) means an in-plane retardation (unit; nm) measured by applying a light having a wavelength of $\lambda$ nm to the layer; Rth($\lambda$) means a thickness-direction retardation (unit; nm) measured by applying a light having a wavelength of $\lambda$ nm to the layer.

3. The liquid crystal display device of claim 2, wherein the first optically anisotropic layer is disposed between the liquid crystal cell and the first polarizing element, and the second optically anisotropic layer is disposed between the liquid crystal cell and the second polarizing element.

4. The liquid crystal display device of claim 1, employing a vertically aligned mode.

5. The liquid crystal display device of claim 4, wherein the first optically anisotropic layer satisfies all of following relations:

$$Re(450) > 0,$$

$$Re(650) < 0,$$

$$Rth(550) > 0, \text{ and}$$

$$|Rth(450)|/|Rth(650)| \geq 1.0.$$

6. The liquid crystal display device of claim 1, employing an in-plane switching mode.

7. The liquid crystal display device of claim 1, wherein the first optically anisotropic layer is a cellulose acylate film.

8. The liquid crystal display device of claim 1, wherein the first optically anisotropic layer comprises at least one Rth enhancer.

9. The liquid crystal display device of claim 1, wherein the first optically anisotropic layer satisfies all of following relations:

$$Re(450) > 0,$$

$$Rth(650) < 0,$$

$$Re(550) > 0, \text{ and}$$

$$|Rth(450)|/|Rth(650)| \geq 1.0 \text{ or } |Rth(450)|/|Rth(650)| < 1.0.$$

* * * * *